United States Patent
Loeb et al.

(10) Patent No.: US 12,033,201 B2
(45) Date of Patent: Jul. 9, 2024

(54) METHOD AND SYSTEM FOR ASSISTING THE SELECTION OF MATERIALS OR PRODUCTS ACCORDING TO HAPTIC PROPERTIES

(71) Applicant: SynTouch, Inc., Montrose, CA (US)

(72) Inventors: Gerald E. Loeb, South Pasadena, CA (US); Peter A. Botticelli, Long Beach, CA (US); David E. Groves, Valencia, CA (US); Alexandra K. Ilic, Pasadena, CA (US); Matthew T. Borzage, San Pedro, CA (US); Jeremy A. Fishel, Chico, CA (US); Kenneth Newell, Cypress, CA (US)

(73) Assignee: SynTouch Inc., Montrose, CA (US)

( * ) Notice: Subject to any disclaimer, the term of this patent is extended or adjusted under 35 U.S.C. 154(b) by 468 days.

(21) Appl. No.: 17/266,072

(22) PCT Filed: Jul. 29, 2019

(86) PCT No.: PCT/US2019/043979
§ 371 (c)(1),
(2) Date: Feb. 4, 2021

(87) PCT Pub. No.: WO2020/033180
PCT Pub. Date: Feb. 13, 2020

(65) Prior Publication Data
US 2021/0350436 A1 Nov. 11, 2021

Related U.S. Application Data

(60) Provisional application No. 62/714,757, filed on Aug. 5, 2018, provisional application No. 62/801,559, filed on Feb. 19, 2019.

(51) Int. Cl.
*G06Q 30/0601* (2023.01)

(52) U.S. Cl.
CPC ..... *G06Q 30/0625* (2013.01); *G06Q 30/0641* (2013.01)

(58) Field of Classification Search
CPC ............... G06Q 30/0625; G06Q 30/0641
See application file for complete search history.

(56) References Cited

U.S. PATENT DOCUMENTS

| 7,765,227 B1 | 7/2010 | Khoshnevisan et al. |
| 2003/0078838 A1* | 4/2003 | Szmanda ........... G06Q 30/0254 707/999.003 |

(Continued)

FOREIGN PATENT DOCUMENTS

KR 20060092416 A 8/2006

OTHER PUBLICATIONS

You touched it and I'm relieved! The effect of online review's tactile cues on consumer's purchase intention. Huang, Jing; Guo, Yulang; Wang, Cheng; Yan, Lei. Journal of Contemporary Marketing Science2. 2: 155-175. Emerald Group Publishing Limited. (2019) (Year: 2019).*

(Continued)

*Primary Examiner* — Michael Misiaszek
(74) *Attorney, Agent, or Firm* — Osha Bergman Watanabe & Burton LLP

(57) ABSTRACT

A method for assisting product selection according to haptic properties involves obtaining at least one product search criterion in a user interface, identifying relevant products, based on the at least one product search criterion, and displaying the relevant products in the user interface. The method further involves obtaining haptic properties for the relevant products, and updating the user interface based on the haptic properties of the relevant products. The haptic (Continued)

properties include values for a multitude of dimensions of touch, previously measured using sensing modalities of a haptic measurement system.

13 Claims, 14 Drawing Sheets

(56) References Cited

U.S. PATENT DOCUMENTS

| | | | |
|---|---|---|---|
| 2011/0157088 A1* | 6/2011 | Motomura | G06F 3/016 |
| | | | 702/19 |
| 2012/0296926 A1* | 11/2012 | Kalin | G06F 16/90324 |
| | | | 707/765 |
| 2014/0195195 A1 | 7/2014 | Fishel et al. | |
| 2016/0025615 A1* | 1/2016 | Fishel | G01N 19/00 |
| | | | 702/33 |
| 2017/0024478 A1 | 1/2017 | Garg et al. | |
| 2017/0262446 A1* | 9/2017 | McLaughlin | G06F 16/9535 |
| 2019/0172074 A1* | 6/2019 | Siwo | G06Q 30/0185 |

OTHER PUBLICATIONS

International Search Report issued in corresponding application No. PCT/US2019/043979 mailed Nov. 18, 2019 (3 pages).
Written Opinion of the International Searching Authority issued in corresponding application No. PCT/US2019/043979 mailed Nov. 18, 2019 (8 pages).
International Preliminary Report on Patentability issued in corresponding application No. PCT/US2019/043979 dated Jun. 2, 2020 (4 pages).

* cited by examiner

METHOD AND SYSTEM FOR ASSISTING THE SELECTION OF MATERIALS OR PRODUCTS ACCORDING TO HAPTIC PROPERTIES

CROSS-REFERENCE TO RELATED APPLICATIONS

This application is a national phase application of International Application No. PCT/US2019/043979, which filed on Jul. 29, 2019. International Application No. PCT/US2019/043979 claims priority to U.S. Provisional Patent Application No. 62/714,757, filed on Aug. 5, 2018, the entire disclosure of which is hereby expressly incorporated by reference herein. This application further claims priority to U.S. Provisional Patent Application No. 62/801,559, filed on Feb. 5, 2019, the entire disclosure of which is hereby expressly incorporated by reference herein.

BACKGROUND

The tactile feel of consumer products is an important part of their value proposition. Customers in a conventional bricks-and-mortar retailer usually take advantage of the opportunity to physically touch the merchandise in order to inform their choices. Customers making purchasing decisions via an internet connection to an etailer (e.g., a retailer selling goods via electronic transactions on the Internet) do not have this opportunity. An etail customer who purchases a particular product and is unhappily surprised by its haptic properties is likely to return the product for a refund and/or elect not to purchase products again from the etailer.

SUMMARY

In general, in one aspect, one or more embodiments relate to a method for assisting product selection according to haptic properties, the method comprising: obtaining at least one product search criterion in a user interface; identifying a plurality of relevant products from a plurality of products in a product database, based on the at least one product search criterion; displaying the plurality of relevant products in the user interface; for each of the plurality of relevant products, obtaining values for a plurality of dimensions of touch, previously measured using sensing modalities of a haptic measurement system; displaying a plurality of haptic descriptors in the user interface, wherein each of the plurality of haptic descriptors represents a human haptic perceptual dimension; identifying a subset of the plurality of haptic descriptors based on a selection made in the user interface; for each of the plurality of relevant products, computing haptic descriptor values for the subset of the plurality of haptic descriptors using the values for the plurality of dimensions of touch; and displaying the haptic descriptor values in the user interface.

In general, in one aspect, one or more embodiments relate to a method for assisting product selection according to haptic properties, the method comprising: obtaining at least one product search criterion in a user interface; identifying a plurality of relevant products from a plurality of products in a product database, based on the at least one product search criterion; displaying the plurality of relevant products in the user interface; for each of the plurality of relevant products, obtaining values for a plurality of dimensions of touch, previously measured using sensing modalities of a haptic measurement system; displaying a plurality of haptic descriptors in the user interface, wherein each of the plurality of haptic descriptors represents a human haptic perceptual dimension; identifying a subset of the plurality of haptic descriptors based on a selection made in the user interface; for each of the plurality of relevant products, computing haptic descriptor values for the subset of the plurality of haptic descriptors using the values for the plurality of dimensions of touch; and for each of the plurality of relevant products, computing a haptic desirability based on the haptic descriptor values; and reordering the displaying of the plurality of relevant products based on the haptic desirability.

In general, in one aspect, one or more embodiments relate to a method for assisting product selection according to haptic properties, the method comprising: obtaining at least one product search criterion in a user interface; identifying a plurality of relevant products from a plurality of products in a product database, based on the at least one product search criterion; displaying the plurality of relevant products in the user interface; for each of the plurality of relevant products, obtaining values for a plurality of dimensions of touch, previously measured using sensing modalities of a haptic measurement system; displaying a plurality of haptic descriptors in the user interface, wherein each of the plurality of haptic descriptors represents a human haptic perceptual dimension; obtaining a weight for each of the plurality of haptic descriptors, in the user interface; for each of the plurality of relevant products, computing haptic descriptor values for the plurality of haptic descriptors using the values for the plurality of dimensions of touch; and for each of the plurality of relevant products, computing a haptic desirability based on the plurality of haptic descriptor values and the weights associated with the plurality of haptic descriptors; and reordering the displaying of the plurality of relevant products based on the desirability.

In general, in one aspect, one or more embodiments relate to a method for assisting product selection according to haptic properties, the method comprising: obtaining at least one product search criterion in a user interface; identifying a plurality of relevant products from a plurality of products in a product database, based on the at least one product search criterion; displaying the plurality of relevant products in the user interface; obtaining a selection of a most desirable product of the plurality of relevant products in the user interface; for each of the plurality of relevant products, obtaining values for a plurality of dimensions of touch, previously measured using sensing modalities of a haptic measurement system; based on a product type of the plurality of relevant products, setting a weighting for the values for the plurality of dimensions of touch; for each of the plurality of relevant products, computing a haptic undesirability based on: a distance between the most desirable product and the relevant product based on the associated values for the plurality of dimensions of touch, and the weighting; and reordering the displaying of the plurality of relevant products based on the haptic undesirability.

In general, in one aspect, one or more embodiments relate to a method for assisting product selection according to haptic properties, the method comprising: obtaining at least one product search criterion in a user interface; identifying a plurality of relevant products from a plurality of products in a product database, based on the at least one product search criterion; displaying the plurality of relevant products in the user interface; for each of the plurality of relevant products, obtaining values for a plurality of dimensions of touch, previously measured using sensing modalities of a haptic measurement system; obtaining a plurality of ratings of a plurality of evaluation samples in the user interface;

obtaining, for each of the plurality of evaluation samples, values for the plurality of dimensions of touch; for each of the plurality of relevant products, computing a haptic undesirability based on: the values for the plurality of dimensions of touch associated with the relevant product, the values for the plurality of dimensions of touch associated with the evaluation samples; and the plurality of ratings; reordering the displaying of the plurality of relevant products based on the haptic undesirability.

In general, in one aspect, one or more embodiments relate to a method for assisting product selection according to haptic properties, the method comprising: obtaining at least one product search criterion in a user interface; identifying a plurality of relevant products from a plurality of products in a product database, based on the at least one product search criterion; displaying the plurality of relevant products in the user interface; for each of the plurality of relevant products, obtaining values for a plurality of dimensions of touch, previously measured using sensing modalities of a haptic measurement system; obtaining a plurality of ratings of a plurality of evaluation samples in the user interface; obtaining, for each of the plurality of evaluation samples, evaluations sample values for the plurality of dimensions of touch; computing a plurality of weights based on a discriminability of the evaluation samples; for each of the plurality of relevant products, computing a haptic undesirability based on: the values for the plurality of dimensions of touch associated with the relevant product, the values for the plurality of dimensions of touch associated with the evaluation samples; the plurality of ratings; and the plurality of weights; reordering the displaying of the plurality of relevant products based on the haptic undesirability.

In general, in one aspect, one or more embodiments of the disclosure relate to a non-transitory computer readable medium including computer readable program code for causing a computer system to: obtain at least one product search criterion in a user interface; identify a plurality of relevant products from a plurality of products in a product database, based on the at least one product search criterion; display the plurality of relevant products in the user interface; for each of the plurality of relevant products, obtain values for a plurality of dimensions of touch, previously measured using sensing modalities of a haptic measurement system; display a plurality of haptic descriptors in the user interface, wherein each of the plurality of haptic descriptors represents a human haptic perceptual dimension; identify a subset of the plurality of haptic descriptors based on a selection made in the user interface; for each of the plurality of relevant products, compute haptic descriptor values for the subset of the plurality of haptic descriptors using the values for the plurality of dimensions of touch; and display the haptic descriptor values in the user interface.

In general, in one aspect, one or more embodiments of the disclosure relate to a non-transitory computer readable medium including computer readable program code for causing a computer system to: obtain at least one product search criterion in a user interface; identify a plurality of relevant products from a plurality of products in a product database, based on the at least one product search criterion; display the plurality of relevant products in the user interface; for each of the plurality of relevant products, obtain values for a plurality of dimensions of touch, previously measured using sensing modalities of a haptic measurement system; display a plurality of haptic descriptors in the user interface, wherein each of the plurality of haptic descriptors represents a human haptic perceptual dimension; identify a subset of the plurality of haptic descriptors based on a selection made in the user interface; for each of the plurality of relevant products, compute haptic descriptor values for the subset of the plurality of haptic descriptors using the values for the plurality of dimensions of touch; and for each of the plurality of relevant products, compute a haptic desirability based on the haptic descriptor values; and reorder the displaying of the plurality of relevant products based on the haptic desirability.

In general, in one aspect, one or more embodiments of the disclosure relate to a non-transitory computer readable medium including computer readable program code for causing a computer system to: obtain at least one product search criterion in a user interface; identify a plurality of relevant products from a plurality of products in a product database, based on the at least one product search criterion; display the plurality of relevant products in the user interface; for each of the plurality of relevant products, obtain values for a plurality of dimensions of touch, previously measured using sensing modalities of a haptic measurement system; display a plurality of haptic descriptors in the user interface, wherein each of the plurality of haptic descriptors represents a human haptic perceptual dimension; obtain a weight for each of the plurality of haptic descriptors, in the user interface; for each of the plurality of relevant products, compute haptic descriptor values for the plurality of haptic descriptors using the values for the plurality of dimensions of touch; and for each of the plurality of relevant products, compute a haptic desirability based on the plurality of haptic descriptor values and the weights associated with the plurality of haptic descriptors; and reorder the displaying of the plurality of relevant products based on the desirability.

In general, in one aspect, one or more embodiments of the disclosure relate to a non-transitory computer readable medium including computer readable program code for causing a computer system to: obtain at least one product search criterion in a user interface; identify a plurality of relevant products from a plurality of products in a product database, based on the at least one product search criterion; display the plurality of relevant products in the user interface; obtain a selection of a most desirable product of the plurality of relevant products in the user interface; for each of the plurality of relevant products, obtain values for a plurality of dimensions of touch, previously measured using sensing modalities of a haptic measurement system; based on a product type of the plurality of relevant products, set a weighting for the values for the plurality of dimensions of touch; for each of the plurality of relevant products, compute a haptic undesirability based on: a distance between the most desirable product and the relevant product based on the associated values for the plurality of dimensions of touch, and the weighting; and reorder the displaying of the plurality of relevant products based on the haptic undesirability.

In general, in one aspect, one or more embodiments of the disclosure relate to a non-transitory computer readable medium including computer readable program code for causing a computer system to: obtain at least one product search criterion in a user interface; identify a plurality of relevant products from a plurality of products in a product database, based on the at least one product search criterion; display the plurality of relevant products in the user interface; for each of the plurality of relevant products, obtain values for a plurality of dimensions of touch, previously measured using sensing modalities of a haptic measurement system; obtain a plurality of ratings of a plurality of evaluation samples in the user interface; obtain, for each of the plurality of evaluation samples, values for the plurality of dimensions of touch; for each of the plurality of relevant products, compute a haptic undesirability based on: the values for the plurality of dimensions of touch associated with the relevant product, the values for the plurality of dimensions of touch associated with the evaluation samples; and the plurality of ratings; reorder the displaying of the plurality of relevant products based on the haptic undesirability.

In general, in one aspect, one or more embodiments of the disclosure relate to a non-transitory computer readable medium including computer readable program code for causing a computer system to: obtain at least one product search criterion in a user interface; identify a plurality of relevant products from a plurality of products in a product database, based on the at least one product search criterion; display the plurality of relevant products in the user interface; for each of the plurality of relevant products, obtain values for a plurality of dimensions of touch, previously measured using sensing modalities of a haptic measurement system; obtain a plurality of ratings of a plurality of evaluation samples in the user interface; obtain, for each of the plurality of evaluation samples, evaluations sample values for the plurality of dimensions of touch; compute a plurality of weights based on a discriminability of the evaluation samples; for each of the plurality of relevant products, compute a haptic undesirability based on: the values for the plurality of dimensions of touch associated with the relevant product, the values for the plurality of dimensions of touch associated with the evaluation samples; the plurality of ratings; and the plurality of weights; reorder the displaying of the plurality of relevant products based on the haptic undesirability.

Other aspects of the disclosure will be apparent from the following description and the appended claims.

DETAILED DESCRIPTION

Figure 1:
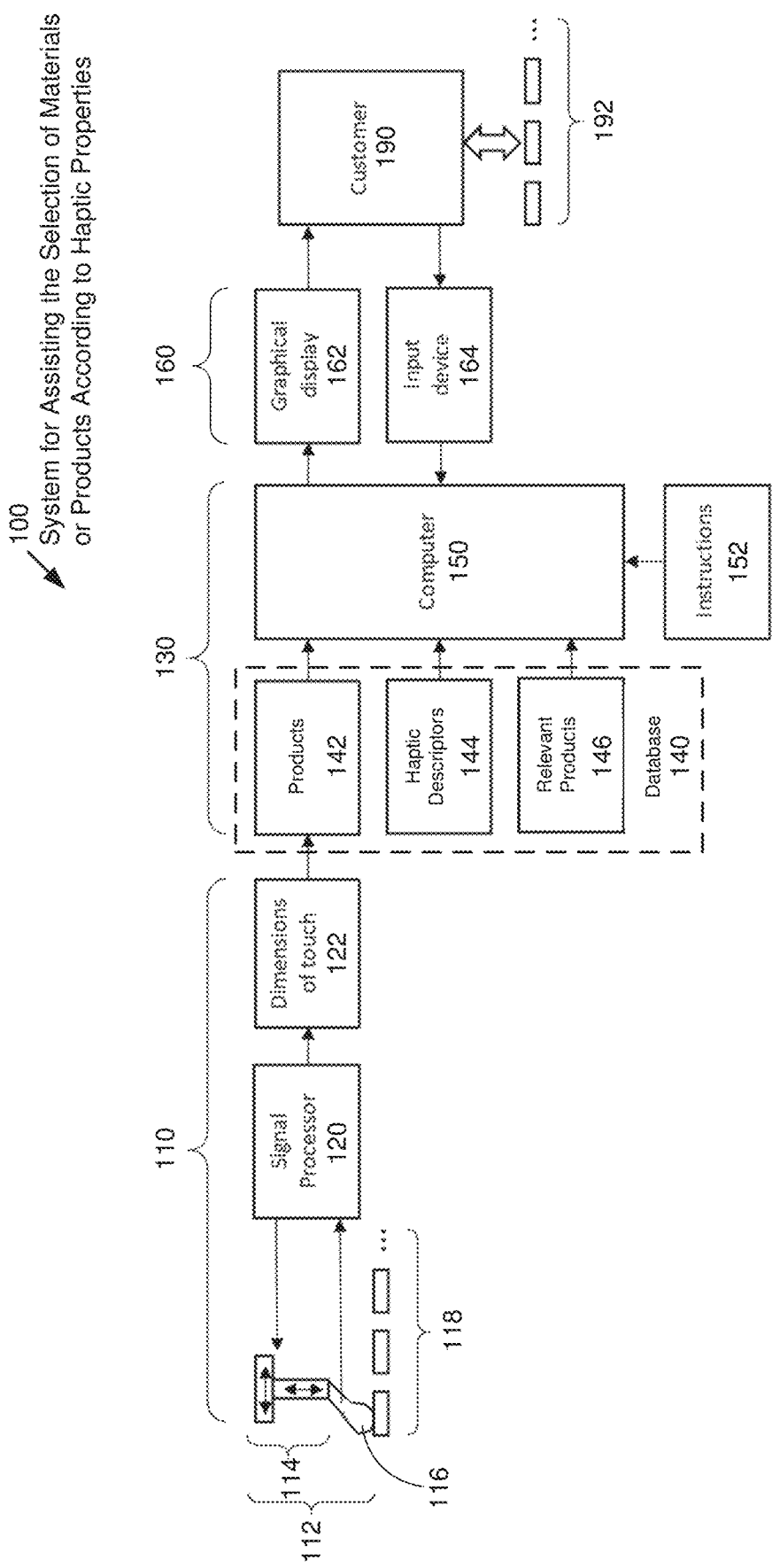
FIG. 1 shows a system for assisting the selection of materials or products according to haptic properties in accordance with one or more embodiments of the disclosure.

Specific embodiments of the disclosure will now be described in detail with reference to the accompanying figures Like elements in the various figures are denoted by like reference numerals for consistency. In the following description of FIGS. 1-13B, any component described with regard to a figure, in various embodiments of the disclosure, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the disclosure, any description of the components of a figure is to be interpreted as an optional embodiment, which may be implemented in addition to, in conjunction with, or in place of the embodiments described with regard to a corresponding like-named component in any other figure.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

In general, embodiments of the disclosure provide combinations of a subsystem for biomimetic measurement of haptic properties of materials, a user interface that displays information related to haptic properties of products that a customer is considering to purchase, and a non-transitory computer medium comprising instructions that cause the information that is displayed to the customer to reflect the haptic preferences of the customer. Various embodiments are described wherein the haptic properties are determined according to one or more dimensions of touch that are variously selected to be relevant to the consumer's likely haptic preferences and the results comparing the products are variously displayed to the customer.

Figure 2:
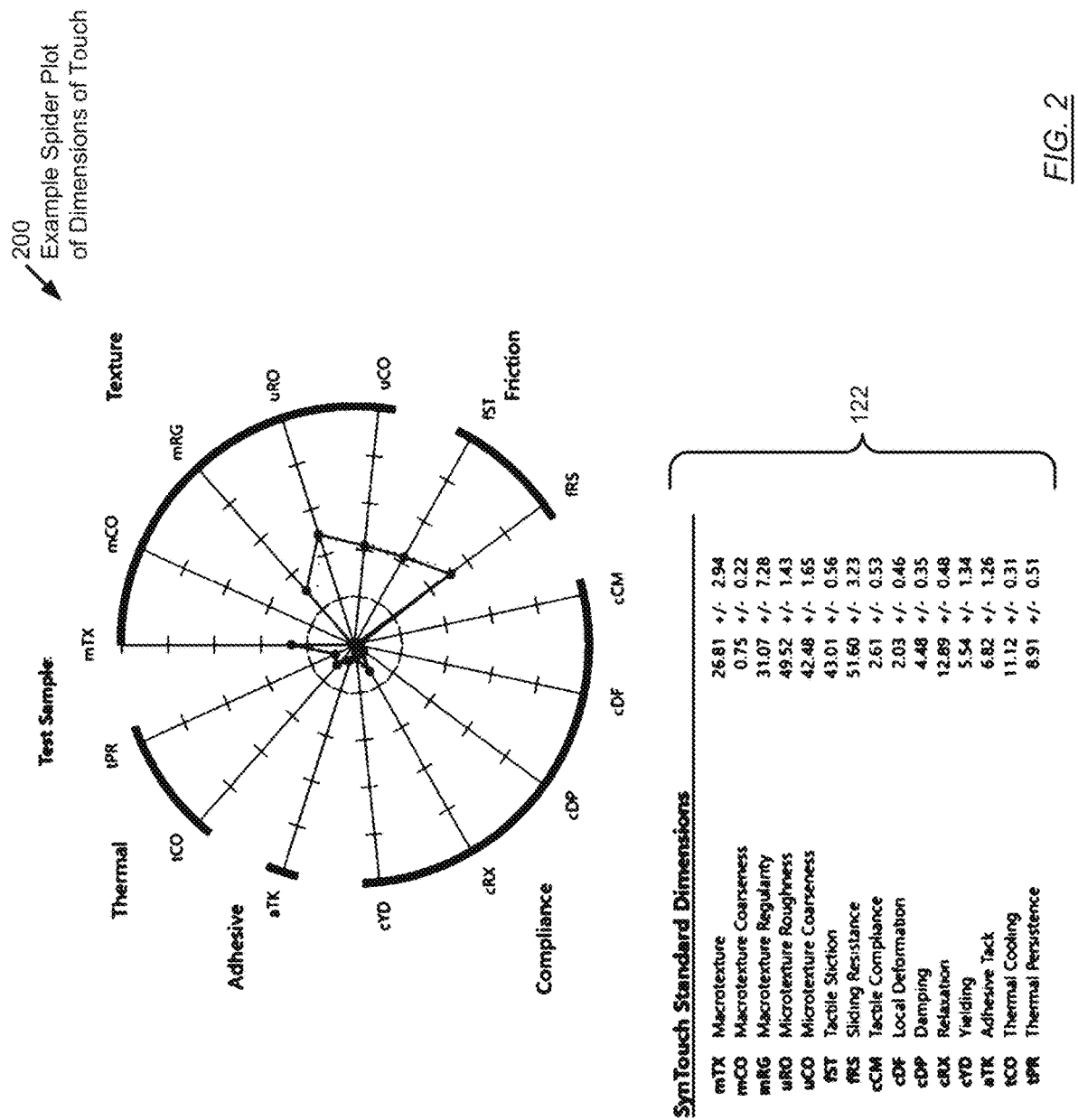
FIG. 2 shows an example spider plot of dimensions of touch in accordance with one or more embodiments of the disclosure.

FIG. 1 shows a system (100) for assisting the selection of materials or products according to haptic properties, in accordance with one or more embodiments. The system (100) may be used to inform customers about the relationship between their personal haptic preferences and the haptic properties of various products that the customer may be considering to purchase. The system (100), as shown, includes three major subsystems:

i) Haptic measurement subsystem (110) may include a biomimetic instrument (112) that employs a motion generator (114) to move tactile sensor (116) in contact with one or more test objects (118) in a manner similar to a human making stroking and poking movements typically employed to characterize the haptic properties of materials. A signal processor (120) may control said movements and may receive data from at least tactile sensor (116) in order to compute values for one or more dimensions of touch (122), as illustrated in FIG. 2. The tactile sensor (116) may have mechanical properties similar to a human fingertip, such as by including a deformable skin with an external surface texture similar to human fingerprints and by mounting said deformable skin onto a rigid core with a shape similar to the human distal phalanx and inflating the space between flexible skin and rigid core with a deformable liquid similar to the human finger pulp, as described in (Loeb, G. E. and Johansson, R. Biomimetic tactile sensor. U.S. Pat. No. 7,658,119, Feb. 9, 2010; Loeb, G. E., Fishel, J., Wettels, N., Santos, V. J. and Peck, R. Measurement of sliding friction-induced vibrations for biomimetic tactile sensing. U.S. Pat. No. 8,181,540, May 22, 2012; Loeb, G. E., Wettels, N., Fishel, J., Lin, C. H., Santos, V. J. and Peck, R. Enhancements to improve the function of a biomimetic tactile sensor, U.S. Pat. No. 8,272,278, Sep. 25, 2012; Wettels, N., Fishel, J. A. and Loeb, G. E. "Multimodal tactile sensor", in The Human Hand as an Inspiration for Robot Hand Development., Balasubramanian, R. and Santos, V. J., eds., Springer Tracts in Advanced Robotics, vol. 95, 2013). Such a haptic measurement subsystem (110) is commercially available as the Toccare® from SynTouch Inc. (Montrose, CA) and is described in more detail in U.S. patent application Ser. No. 14/796,647, filed Jul. 10, 2015, published Jan. 28, 2016, and incorporated herein by reference. A brief description of the haptic measurement system (110) is provided below with reference to FIG. 12. The methods described in FIGS. 3-9 are not limited to the use of the haptic measurement system (110), though. There are a wide range of applicable methods for obtaining objective measures of tactile dimensions including various instrument (e.g., scanning electron microscope, atomic force friction measurements, stick slip, 3- or 4-point bending tests, profilometry, and coordinate measurement machine, mass balances), and non-instrument (e.g., trained sensory panel human data, consumer panel human data, and golden hand data where sensory experts select ideal attributes) methods, any of which may be applicable.

ii) Computational subsystem (130) may include a database (140) and a computer (150). The computer (150) may include one or more components of the computing system described in FIGS. 13A and 13B. The computer (150) may operate on information in the database (140) according to various instructions (152) that may be provided as explained in more detail in the flowcharts in subsequent FIGS. 3-9.

The database (140) may be any type of storage unit and/or device (e.g., a file system, database, collection of tables, or any other storage mechanism) for storing data. Further, the database may include multiple different storage units and/or devices. The multiple different storage units and/or devices may or may not be of the same type or located at the same physical site. In one or more embodiments, the database (140) stores information about products (142), haptic properties (144), and products on offer (146), as subsequently described.

The products (142) may be a collection of products available for purchase. Different product lines, product variations, etc. may be included. For example, an etailer may offer products (142) as diverse as furniture, kitchenware, clothing, gardening tools, etc. Typically, the customer (190), when considering making a purchase, may provide search terms (for example, "patio furniture" or "bedsheets") to enable the system (100) to identify relevant products (146) from the products (142). In one or more embodiments, each of the products (142) may be accompanied by the dimensions of touch (122) of the product, as initially measured by the haptic measurement subsystem (110) using the test objects (118) associated with the product. In other words, a product (142) in the database (140) is accompanied by a quantification of the product's haptic properties.

Accordingly, the etailer may first use the haptic measurement subsystem (110) to populate the database (140) of products (142) with the values for one or more dimensions of touch (122) for all of the products whose haptic properties may be of interest to any customer (190), as well as all of the evaluation samples (192), such as materials in swatch books and virtual swatch books.

In one or more embodiments, the dimensions of touch (122) may be combined into haptic descriptors (144). A haptic descriptor may include descriptive language used by human observers to characterize an attribute of a material. Each of the haptic descriptors may represent one human haptic perceptual dimension. Accordingly, the haptic descriptors (144) may include common words such as, for example, "soft", "firm", "smooth", "warm", "cool", "fuzzy", etc. selected according to the intuition of the programmer or the results of psychophysical studies such as Hollins, M., Faldowski, R., Rao, S., and Young, F. (1993) Perceptual dimensions of tactile surface texture: a multidimensional scaling analysis. Percept. Psychophys. 54,697-705. Each of the haptic descriptors (144) may be associated with one or more dimensions of touch (122) according to a relationship specified in the database. The relationship may be an equation or table, or any other relationship, based on the intuition of the programmer or the results of psychophysical studies of human subjects such as are well-known in the art. To further illustrate the relationship between dimensions of touch and a haptic descriptor, consider the following example: Assume that for the haptic descriptor "soft" with a haptic descriptor value capturing softness "S", there is a simple linear relationship that causes three dimensions of touch "A", "B", and "C" to contribute to a haptic perception of softness. This representation may be expressed using the equation S=xA+yB+zC, where x, y, and z are multiplicative gains that determine to what degree A, B, and C contribute to the softness. Those skilled in the art will appreciate that an actual relationship between a value for a haptic descriptors and the values for the dimension of touch may be of any form and complexity, including any type of linear and non-linear relationships.

The haptic descriptors (144) may, thus, enable a customer (190) to select a product (142) using intuitive terminology rather than abstract quantifications. More specifically, during a shopping session, the etailer may identify a list of relevant products (146) from the products (142), typically based on search terms supplied by customer (190) or the shopping history of customer (190) as recorded and processed by the etailers ecommerce software. Consider for example, the purchase of a towel: The customer may simply require the towel to be "soft", thereby providing a haptic descriptor (144). The system (100) may then translate the provided haptic descriptor (144) into the corresponding dimensions of touch (122) to enable the system to identify towels (i.e., relevant products (146)) that feel soft, from the products (142).

iii) User interface (160) may include a graphical display (162) and an input device (164), either or both of which may interact with a customer (190), who may be at a site that is distant from the other subsystems (haptic measurement subsystem (110), computational subsystem (130)) of the system (100). Customer (190) may be asked to provide their subjective judgment or preference regarding the haptic properties of evaluation samples (350) The evaluation samples (350) may be physical samples of materials in one or more swatch books (not shown) or one or more virtual swatch books (not shown), each consisting of a list of common materials whose haptic properties are generally familiar, such as flannel, corduroy, burlap, coarse sandpaper, polished marble, kitchen sponge, memory foam, etc. The user interface using input devices and output devices are described in FIGS. 13A and 13B.

Still referring to FIG. 1, the etailer may first use the haptic measurement subsystem (110) to populate the database of products (142) with the values for one or more dimensions of touch (122) for all of the products whose haptic properties may be of interest to any customer (190), as well as all of the evaluation samples (350), e.g., materials in swatch books and/or virtual swatch books. The values for the one or more dimensions of touch (122) may be according to a multidimensional representation known as the SynTouch Standard, as described in FIG. 2, or according to any other standard. Then, during a shopping session, the etailer may identify a list of relevant products (146), typically based on search terms supplied by customer (190) or the shopping history of customer (190) as recorded and processed by the etailers ecommerce software. A detailed description of these and other steps is provided below with reference to FIGS. 3-9.

While FIG. 1 shows a configuration of components, other configurations may be used without departing from the scope of the disclosure. For example, various components may be combined to create a single component. As another example, the functionality performed by a single component may be performed by two or more components.

Turning to FIG. 2, an example spider plot (200) of dimensions of touch, in accordance with one or more embodiments of the disclosure, is shown. In the example, values of 15 dimensions of touch (122) are simultaneously displayed for a material. A similar plot may be used to simultaneously display dimensions of touch for several different materials. The example spider plot (200) is based on the SynTouch Standard. The SynTouch Standard currently includes 15 dimensions of touch encompassing compliance, friction, textural and thermal properties extracted from the signals generated by a patented biomimetic tactile sensor (trade-named BioTac) during biomimetic exploratory movements made by a patented specialized robot (trade-named Toccare). Additional dimensions of touch may be added by additional processing of the measurement data obtained with the current BioTac or using data obtained from other sensors. Statistical methods well-known in the art such as principal components analysis may be applied to determine which of the dimensions in the multidimensional representations account for the majority of the differences in desirability/undesirability among the materials in the swatch book.

While the example spider plot (200) shows 15 dimensions of touch, any number of dimensions of touch may be used without departing from the disclosure. The spider plot when used to describe the haptic properties of each item in a list of relevant products (146) may be displayed along with any other distinguishing information (e.g. color, size, price, etc.) so that the customer (190) may select which one of the relevant products to purchase.

In the subsequent paragraphs, a few examples for dimensions of touch are discussed. Other dimensions of touch, although not explicitly discussed, may be used without departing from the disclosure.

Macrotexture roughness may be measured using a vibration sensor of the tactile sensor (116). The vibration sensor may produce a time-varying signal indicative of vibration when performing an exploratory movement that includes sliding the vibration sensor across a surface of the object with a normal force in the range of, for example, 0.2-2 N and a tangential velocity in the range of, for example, 0.5-10 cm/s. A vibration intensity in a frequency band that is within, for example, 5-100 Hz may be considered when analyzing the received time-varying signal indicative of vibration.

Microtexture roughness may be obtained analogous to the macrotexture roughness, although using a different frequency band. For example, a vibration intensity in a frequency band at 20-800 Hz may be considered when analyzing the received time-varying signal indicative of vibration.

Macrotexture coarseness may be obtained analogous to the macrotexture roughness. However, the vibration frequency rather than the vibration intensity may be considered.

Microtexture coarseness may be obtained analogous to the microtexture roughness. However, the vibration frequency rather than the vibration intensity may be considered.

Macrotexture regularity may be obtained analogous to the macrotexture roughness. However, the distribution of the vibration frequency content rather than the vibration intensity may be considered.

Tactile stiction may be obtained while performing the previously described exploratory movements. A measure of a peak tangential force in the time-varying signal as the tactile sensor transitions from rest to sliding may be indicative of the tactile stiction.

Tactile sliding resistance may be obtained while performing the previously described exploratory movements. A measure of an average tangential force in the time-varying signal may be indicative of the tactile sliding resistance.

Tactile compliance may be obtained while pushing the tactile sensor into a surface of the object with a normal force in the range of, for example, 0.2-15 N. A measure of a normal force and displacement may be used to determine a ratio of displacement to normal force in the time-varying signals, indicative of the tactile compliance.

Tactile deformability may be obtained using a sensor that measures pressure or a distributed array of force and that produce a time-varying signal indicative of local deformation; the exploratory movement may include pushing a biomimetic tactile sensor into a surface of the object with a normal force in the range of, for example, 0.2-15 N. The local deformation obtained from the time-varying signal may be indicative of the tactile deformability.

Tactile damping may be obtained from the time-varying signals indicative of normal force and displacement when pushing a tactile sensor into a surface of the object with a normal force in the range of, for example, 0.2-15 N and then reducing that force while maintaining contact with the object. The ratio of energy recovered from the object during the lifting to energy required to compress the object in the time-varying signals may be indicative of the tactile damping.

Tactile relaxation may be obtained from the time-varying signals indicative of normal force when pushing a tactile sensor into a surface of the object with a normal force in the range of, for example, 0.2-15 N and holding the biomimetic tactile sensor in place. The change in the normal force while the tactile sensor is held in place from the time-varying signal may be indicative of the tactile relaxation.

Tactile yielding may be obtained from the time-varying signals indicative of displacement when pushing a tactile sensor into a surface of the object with a normal force in the range of, for example, 0.2-15 N and then reducing that force while maintaining contact with the object. The ratio of displacement recovered after reduction of force to displacement imposed during the pushing from the time-varying signal may be indicative of the tactile yielding.

Thermal cooling may be obtained from the time varying signals indicative of heat transfer into or out of at least one temperature sensor when pushing the sensor(s) against a surface of the object with a normal force in the range of, for example, 0.2-15 N and holding the sensor(s) in place after the pushing. The rate of heat transfer that takes place between, for example 1-5 seconds after sensor(s) contact the object may be indicative of the thermal cooling.

Thermal persistence may be obtained using analogous to the thermal cooling. The rate of heat transfer that takes place between, for example, 5-15 seconds after the sensor(s) contact the object may be indicative of the thermal persistence.

Adhesion may be obtained from the time-varying signals indicative of normal force when pushing a tactile sensor against a surface of the object with a normal force in the range of, for example, 0.2-15 N and then lifting the tactile sensor off of the object. The change in the normal force while the tactile sensor is lifted off of the object may be indicative of the adhesion.

FIGS. 3, 4, 5, 6, 7, 8, and 9 show flowcharts in accordance with one or more embodiments of the disclosure. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the disclosure. By way of an example, determination steps may not require a processor to process an instruction unless an interrupt is received to signify that condition exists in accordance with one or more embodiments of the disclosure. As another example, determination steps may be performed by performing a test, such as checking a data value to test whether the value is consistent with the tested condition in accordance with one or more embodiments of the disclosure.

Figure 3:
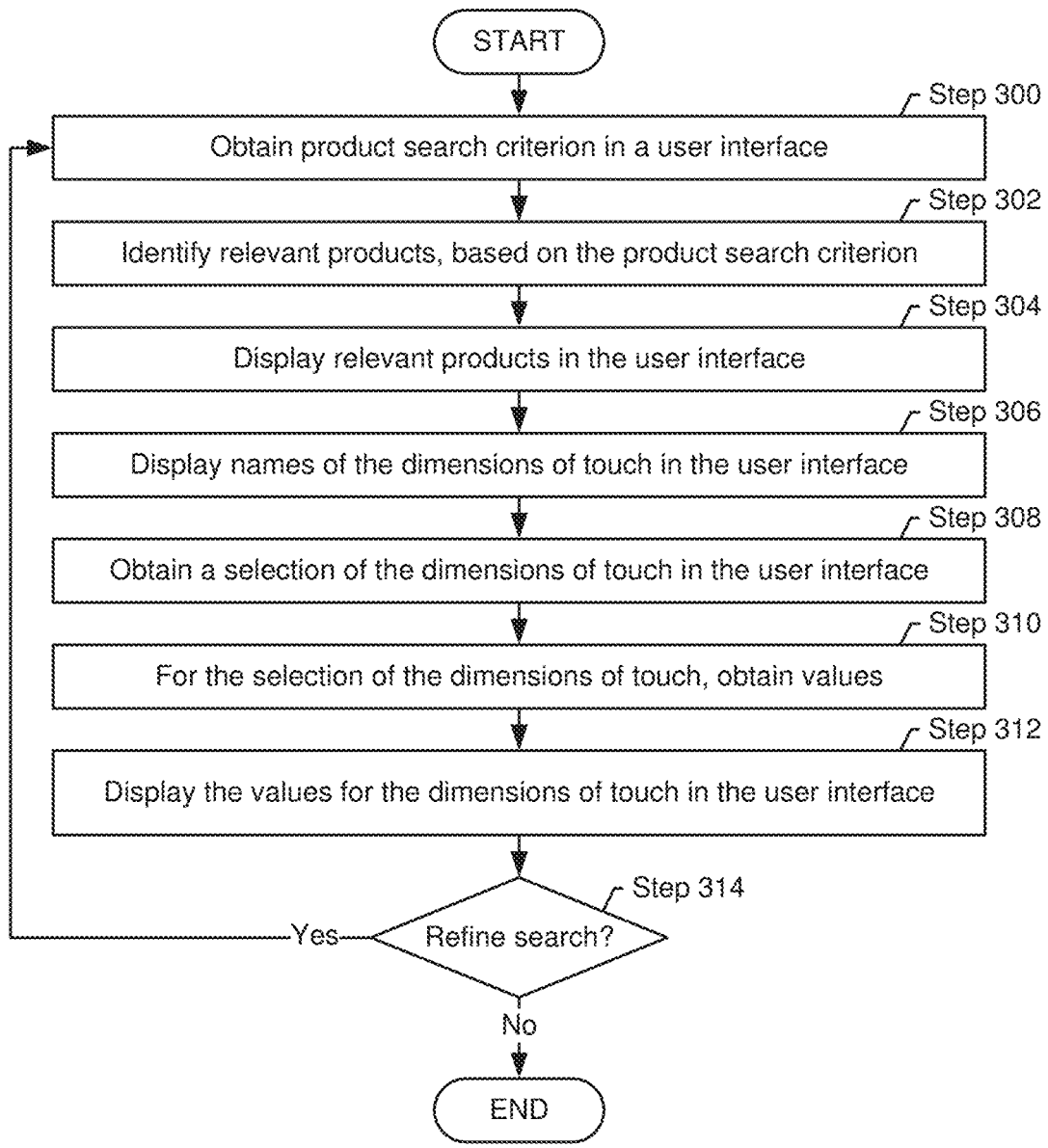
FIG. 3 shows a flowchart describing a method for selecting and displaying one or more dimensions of touch for each of a multiplicity of products that a customer is considering to purchase, in accordance with one or more embodiments of the disclosure.

FIG. 3 shows a flowchart describing a method for selecting and displaying one or more dimensions of touch for each of a multiplicity of products that a customer is considering to purchase. The method of FIG. 3 may assist a customer in selecting a product for purchase, by providing the customer with information regarding tactile characteristics of the products that the customer may want to purchase. The availability of these tactile characteristics may allow the customer to decide on the desirability of the products, while reviewing the products in an etailer's sales portal.

In Step 300, at least one product search criterion is obtained in the user interface, for example when a customer accesses the sales portal of an etailer. The at least one product search criterion may be received from a customer using the input device to define search criteria that identify the range of products that he/she is interested to purchase. The at least one product search criterion may have any degree of specificity. For example, the customer may simply want to perform a search for furniture using the search criterion "patio furniture". In another example, the customer wants to be more specific and specifies the search criteria "patio furniture" and "sofa". Other search criteria may specify a price, a material, a style, a color, etc. Any search criterion or combination of search criteria may be received in Step 300, without departing from the disclosure. The at least one search criterion may include free text, selections via checkboxes, menus, etc.

In Step 302, one or more relevant products are identified based on the at least one search criterion. The identification of relevant products may involve a search of the products in the database that fit the at least one search criterion.

In Step 304, the one or more relevant products are displayed in the user interface, enabling the customer to review the identified relevant products. Any number of relevant products, e.g., K relevant products may be displayed. The user may investigate the relevant products by reviewing photos, videos, descriptive text, reviews, etc., of the relevant product(s).

In Step 306, the names of dimensions of touch are displayed in the user interface. For example, the user interface may show: "Thermal Cooling", "Adhesion", and "Tactile Stiction". The names of the dimensions of touch may be provided as a list, or in any other format.

In Step 308, a selection of one or more dimensions of touch is obtained in the user interface. Any number of dimensions of touch, e.g., I dimensions of touch may be selected. For example, the customer may select "Thermal Cooling" in the user interface, e.g., by activating a checkbox in the user interface. The customer may have selected "Thermal Cooling" because he/she is interested in the thermal cooling characteristics of the relevant products that are currently displayed in the user interface.

In Step 310, values are obtained for the selected dimension(s) of touch, for each of the relevant products. The values may be retrieved from the database, where the dimensions of touch are stored for each of the products. Assuming that there are K relevant products, and that the customer selected I dimensions of touch, the selected I values would be obtained for each of the K relevant products. Referring to FIG. 2, and assuming that the customer wants to view a value for "Thermal Cooling" for a relevant product, the value "11.12+/−0.31 may be retrieved from the database. As previously discussed with reference to FIGS. 1 and 2, the values for the dimensions of touch for the products were previously measured using the haptic measurement system.

In Step 312, the values for the selected dimension(s) of touch, for each of the relevant products are displayed in the user interface. The values may simply be displayed with or without a range. Alternatively, a graphical rending of the values may be produced to better inform the customer of the degree that a value may satisfy the customer's need and/or expectation. A value may be displayed in raw format or scaled to a particular range. The format used for presenting the values for the selected dimension(s) of touch may be specified by the etailer, the customer, the manufacturer of specific goods, or other stakeholder. Various examples are provided in FIG. 11A.

In Step 314, based on the customer's input, the search for a product may be refined or not. The search may be refined if the customer decides to enter a refined set of search criteria. In this case, the execution of the method may return to Step 300. Alternatively, the execution of the method may terminate, for example, by the customer selecting one or more of the relevant products for purchase or simply by abandoning the search. If the customer decides to purchase one or more of the products, the decision to purchase may have been influenced by the availability of the values for the dimensions of touch. For example, if multiple relevant products are presented to the customer, and the customer primarily cares about "Thermal Cooling" the customer may decide to select the product with the highest associated value for "Thermal Cooling".

Figure 4:
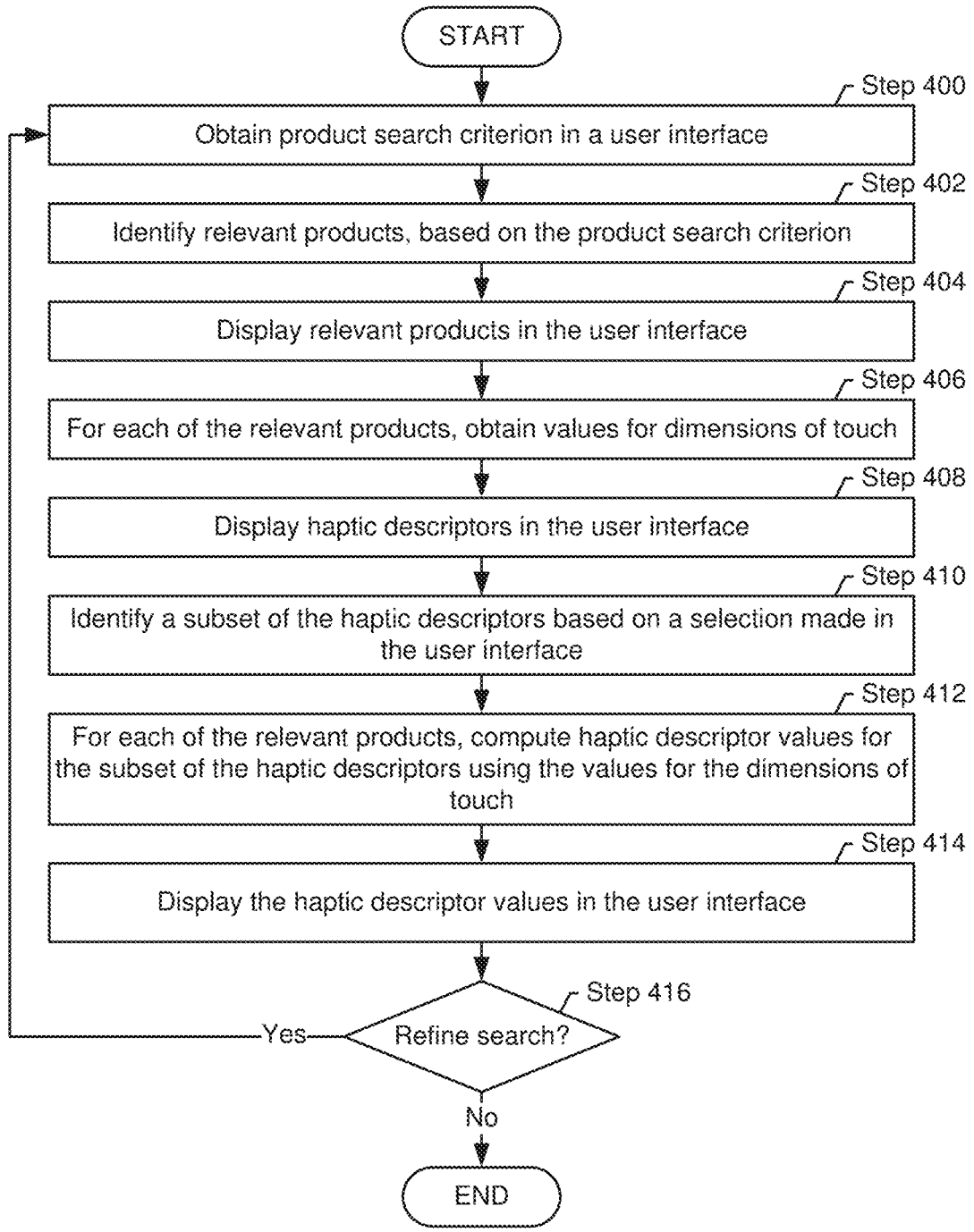
FIG. 4 shows a flowchart describing a method for combining dimensions of touch to generate and display a comparator of the overall haptic properties of a multiplicity of products that a customer is considering to purchase, in accordance with one or more embodiments of the disclosure.

FIG. 4 shows a flowchart describing a method for combining dimensions of touch to generate and display a comparator of the overall haptic properties of a multiplicity of products that a customer is considering to purchase. The method of FIG. 4 relies on intuitive haptic descriptors including common words such as "soft", "firm", "smooth", "warm", "cool", "fuzzy", etc. The availability of these haptic descriptors for products that the customer may choose from may make it easier for the customer to decide on the desirability of the products, while reviewing the products in an etailer's sales portal.

In Step 400, at least one product search criterion is obtained in the user interface for example when a customer accesses the sales portal of an etailer. The at least one product search criterion may be received from a customer using the input device to define search criteria that identify the range of products that he/she is interested to purchase. The at least one product search criterion may have any degree of specificity. For example, the customer may simply want to perform a search for furniture using the search criterion "patio furniture". In another example, the customer wants to be more specific and specifies the search criteria "patio furniture" and "sofa". Other search criteria may specify a price, a material, a style, a color, etc. Any search criterion or combination of search criteria may be received in Step 400, without departing from the disclosure. The at least one search criterion may include free text, selections via checkboxes, menus, etc.

In Step 402, one or more relevant products are identified based on the at least one search criterion. The identification of relevant products may involve a search of the products in the database that fit the at least one search criterion.

In Step 404, the one or more relevant products are displayed in the user interface, enabling the customer to review the identified relevant products. Any number of relevant products, e.g., K relevant products may be displayed. The user may investigate the relevant products by reviewing photos, videos, descriptive text, reviews, etc., of the relevant product(s).

In Step 406, values for dimensions of touch are obtained for each of the relevant products. The values may be retrieved from the database, where the dimensions of touch are stored for each of the products. Assuming that there are K relevant products, and that there are D dimensions of touch, the selected D values would be obtained for each of the K relevant products. As previously discussed with reference to FIGS. 1 and 2, the values for the dimensions of touch for the products were previously measured using the haptic measurement system.

In Step 408, haptic descriptors are displayed in the user interface. For example, the user interface may show the terms "soft", "firm", "smooth", "warm", "cool", and "fuzzy", represented in the database as discussed with reference to FIG. 1. The haptic descriptors may be provided as a list, or in any other format.

In Step 410, a subset of one or more haptic descriptors is obtained, based on a selection made by the customer in the user interface. The selection of haptic descriptors may be based on the customer's interest. For example, the customer may select the haptic descriptors "warm" and "fuzzy" because he/she is considering purchasing a pillow with such characteristics. The selection may be made, for example, by activating a checkboxes next to the corresponding haptic descriptors. For the following steps, assume that the selection includes a number J of haptic descriptors.

In Step 412, haptic descriptor values are computed for the subset of the haptic descriptors, for each of the relevant products. To do so, the values for the dimensions of touch associated with a relevant product are processed using the relationship specified for the haptic descriptors, in the database. This operation may be performed for each of the relevant products. A number J of haptic descriptor values may be obtained for each of the K relevant products.

In Step 414, the haptic descriptor values for each of the relevant products are displayed in the user interface. The values may simply be displayed as a numerical output. Alternatively, a graphical rending of the values may be produced to better inform the customer of the degree that a value may satisfy the customer's need and/or expectation. A value may be scaled to a particular range. The format used for presenting the values for the selected dimension(s) of touch may be specified by the etailer, the customer, the manufacturer of specific goods, or other stakeholder. Various examples are provided in FIG. 11A.

In Step 416, based on the customer's input, the search for a product may be refined or not. The search may be refined if the customer decides to enter a refined set of search criteria. In this case, the execution of the method may return to Step 400. Alternatively, the execution of the method may terminate, for example, by the customer selecting one or more of the relevant products for purchase or simply by abandoning the search. If the customer decides to purchase one or more of the products, the decision to purchase may have been influenced by the availability of the haptic descriptor values. For example, if multiple relevant products are presented to the customer, and the customer primarily cares about "softness" the customer may decide to select the product with the highest associated haptic descriptor value for "softness". Simple, intuitive information that is easier to interpret than individual values for dimensions of touch may facilitate the customer's decision making.

Figure 5:
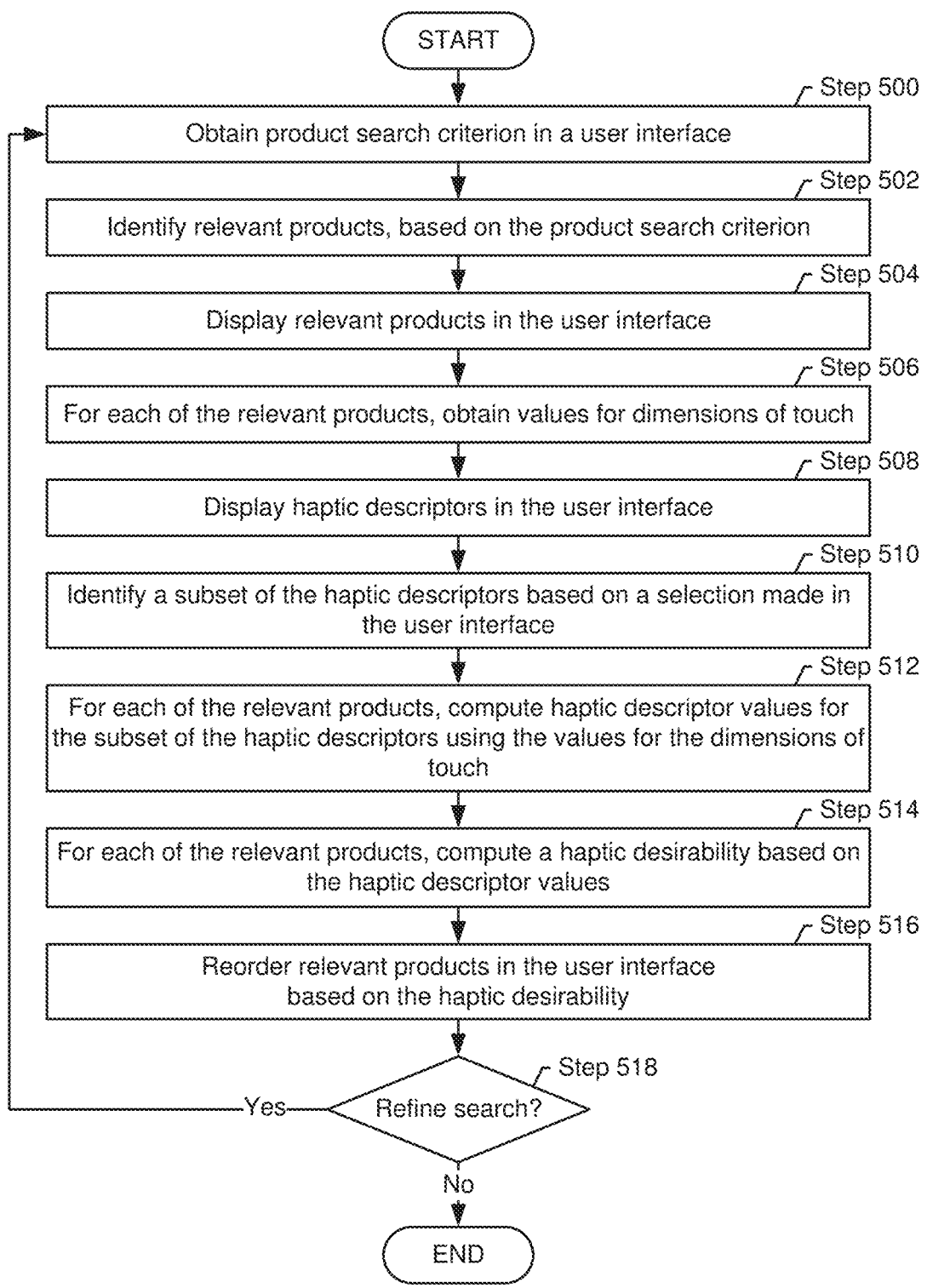
FIG. 5 shows a flowchart describing a method for reordering graphical renderings of individual products that a customer is considering to purchase, according to one or more haptic properties as selected by the customer, in accordance with one or more embodiments of the disclosure.

FIG. 5 shows a flowchart describing a method for reordering graphical renderings of individual products that a customer is considering to purchase, according to one or more haptic properties as selected by the customer. More specifically, the relative haptic desirability of the list of relevant products may be presented to customer by reordering the graphical rendering that describes each of the relevant products as they are presented on one or more pages of the graphical display, as illustrated in FIGS. 11B and 11C, and discussed in more detail below. In FIG. 5, the customer may be offered a menu of haptic descriptors and asked to make a selection of one or more that would affect the haptic desirability of the various relevant products. The relevant products may then be reordered in the graphical display based on their predicted desirability. Reordering the graphical renderings has the advantage that it requires no additional graphics or display space beyond the usual description of each product. The haptic desirability described herein to determine the reordering may be combined with other information about the customer's known or likely preferences regarding features such as price, color, style, etc. that may be known to or inferred by the etailer on the basis of the customer's prior shopping history, demographics or other information that is available to the etailer, according to methods that are well-known to practitioners of the art of ecommerce.

In Step 500, at least one product search criterion is obtained in the user interface for example when a customer accesses the sales portal of an etailer. The at least one product search criterion may be received from a customer using the input device to define search criteria that identify the range of products that he/she is interested to purchase. The at least one product search criterion may have any degree of specificity. For example, the customer may simply want to perform a search for furniture using the search criterion "patio furniture". In another example, the customer wants to be more specific and specifies the search criteria "patio furniture" and "sofa". Other search criteria may specify a price, a material, a style, a color, etc. Any search criterion or combination of search criteria may be received in Step 500, without departing from the disclosure. The at least one search criterion may include free text, selections via checkboxes, menus, etc.

In Step 502, one or more relevant products are identified based on the at least one search criterion. The identification of relevant products may involve a search of the products in the database that fit the at least one search criterion.

In Step 504, the one or more relevant products are displayed in the user interface, enabling the customer to review the identified relevant products. Any number of relevant products, e.g., K relevant products may be displayed. The user may investigate the relevant products by reviewing photos, videos, descriptive text, reviews, etc., of the relevant product(s).

In Step 506, values for dimensions of touch are obtained for each of the relevant products. The values may be retrieved from the database, where the dimensions of touch are stored for each of the products. Assuming that there are K relevant products, and that there are D dimensions of touch, the selected D values would be obtained for each of the K relevant products. As previously discussed with reference to FIGS. 1 and 2, the values for the dimensions of touch for the products were previously measured using the haptic measurement system.

In Step 508, haptic descriptors are displayed in the user interface. For example, the user interface may show the terms "soft", "firm", "smooth", "warm", "cool", and "fuzzy", represented in the database as discussed with reference to FIG. 1. The haptic descriptors may be provided as a list, or in any other format.

In Step 510, a subset of one or more haptic descriptors is obtained, based on a selection made by the customer in the user interface. The selection of haptic descriptors may be based on the customer's interest. For example, the customer may select the haptic descriptors "warm" and "fuzzy" because he/she is considering purchasing a pillow with such characteristics. The selection may be made, for example, by activating checkboxes next to the corresponding haptic descriptors. For the following steps, assume that the selection includes a number J of haptic descriptors.

In Step 512, haptic descriptor values are computed for the subset of the haptic descriptors, for each of the relevant products. To do so, the values for the dimensions of touch associated with a relevant product are processed using the relationship specified for the haptic descriptors, in the database. This operation may be performed for each of the relevant products. A number J of haptic descriptor values may be obtained for each of the K relevant products.

In Step 514, a haptic desirability is computed for each of the relevant products, based on the haptic descriptor values. The haptic desirability for a particular relevant product may be the sum of the J haptic descriptor values H associated with that product, $V_k = \Sigma_{j \in J} H_{k,j}$, where $V_k$ is the haptic desirability of product k. Alternatively, other combinations, different from the sum may be used without departing from the disclosure. The haptic desirability may be computed for all K relevant products.

In Step 516, the relevant products may be reordered in the user interface, based on their haptic desirability. The relevant products may be reordered in a descending order. The order of presentation of the relevant products could also be influenced additionally by the etailer's goals such as maximizing profit margins, clearing inventory, facilitating shipping, etc. It may not be necessary or desirable to inform the customer of the various factors contributing to the order of presentation. An example of the reordering is provided in FIGS. 11B and 11C. FIG. 11B shows products prior to the reordering (for example, after execution of Step 504), and FIG. 11C shows the same products after the reordering.

In Step 518, based on the customer's input, the search for a product may be refined or not. The search may be refined if the customer decides to enter a refined set of search criteria. In this case, the execution of the method may return to Step 500. Alternatively, the execution of the method may terminate, for example, by the customer selecting one or more of the relevant products for purchase or simply by abandoning the search. If the customer decides to purchase one or more of the products, the decision to purchase may have been influenced by the ordering of the relevant products, governed by the haptic desirability as initially specified by the customer.

Figure 6:
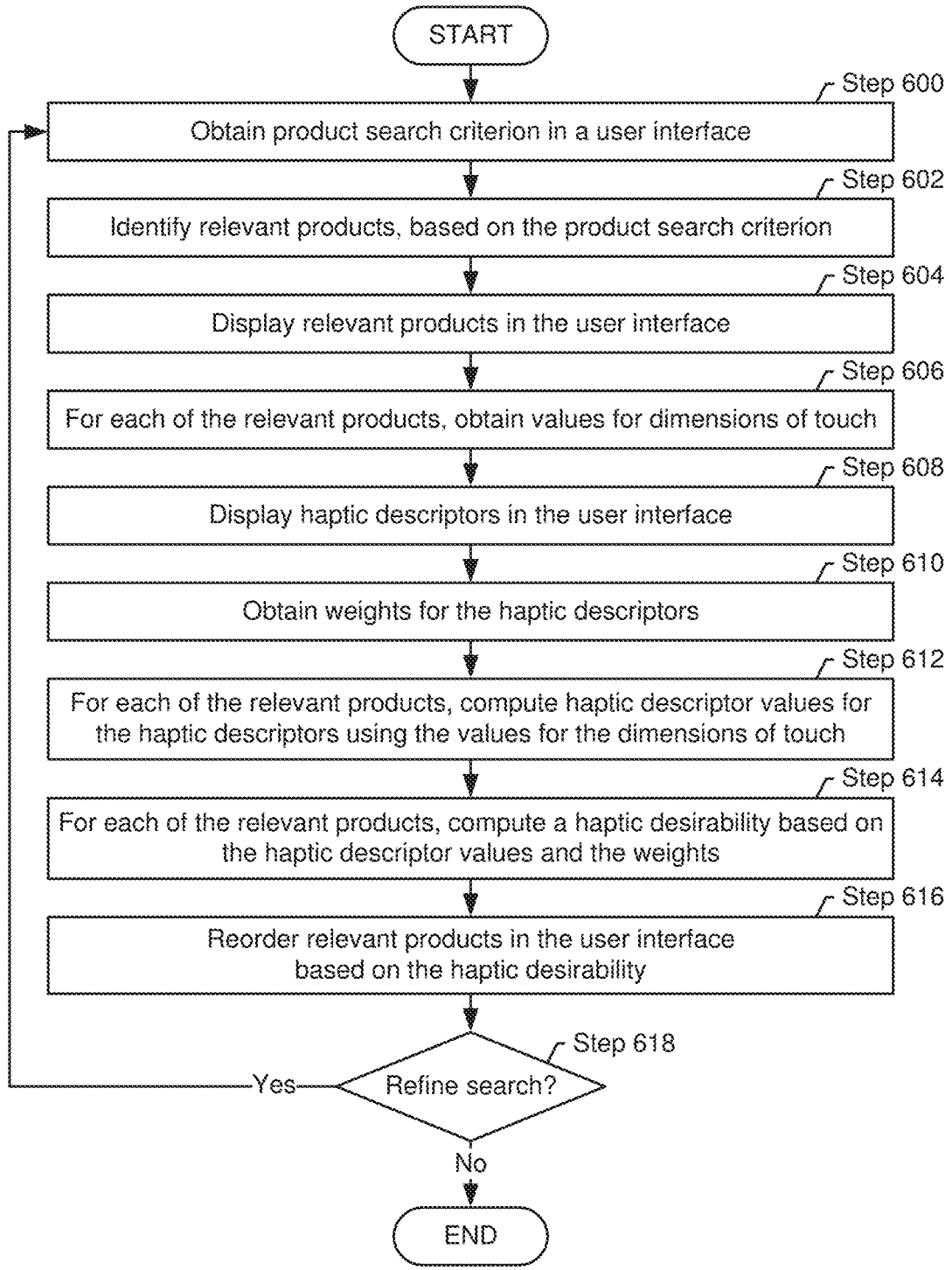
FIG. 6 shows a flowchart describing a method for reordering graphical renderings of individual products that a customer is considering to purchase, according to the relative importance of a multiplicity of haptic properties as selected by the customer, in accordance with one or more embodiments of the disclosure.

FIG. 6 shows a flowchart describing a method for reordering graphical renderings of individual products that a customer is considering to purchase, according to the relative importance of a multiplicity of haptic properties as selected by the customer. The customer may specify a relative importance of individual haptic properties. The relative haptic desirability of the list of relevant products may then be presented to customer by reordering the graphical rendering that describes each of the relevant products as they are presented on one or more pages of the graphical display, as illustrated in exemplary FIGS. 11B, and 11C, and discussed in more detail below. In FIG. 6, the customer may be offered a menu of haptic descriptors and asked to make a selection of one or more that would affect the haptic desirability of the various relevant products. The relevant products may then be reordered in the graphical display based on their predicted desirability. Reordering the graphical renderings has the advantage that it requires no additional graphics or display space beyond the usual description of each product. The haptic desirability described herein to determine the reordering may be combined with other information about the customer's known or likely preferences regarding features such as price, color, style, etc. that may be known to or inferred by the etailer on the basis of the customer's prior shopping history, demographics or other information that is available to the etailer, according to methods that are well-known to practitioners of the art of ecommerce.

In Step 600, at least one product search criterion is obtained in the user interface for example when a customer accesses the sales portal of an etailer. The at least one product search criterion may be received from a customer using the input device to define search criteria that identify the range of products that he/she is interested to purchase. The at least one product search criterion may have any degree of specificity. For example, the customer may simply want to perform a search for furniture using the search criterion "patio furniture". In another example, the customer wants to be more specific and specifies the search criteria "patio furniture" and "sofa". Other search criteria may specify a price, a material, a style, a color, etc. Any search criterion or combination of search criteria may be received in Step 600, without departing from the disclosure. The at least one search criterion may include free text, selections via checkboxes, menus, etc.

In Step 602, one or more relevant products are identified based on the at least one search criterion. The identification of relevant products may involve a search of the products in the database that fit the at least one search criterion.

In Step 604, the one or more relevant products are displayed in the user interface, enabling the customer to review the identified relevant products. Any number of relevant products, e.g., K relevant products may be displayed. The user may investigate the relevant products by reviewing photos, videos, descriptive text, reviews, etc., of the relevant product(s).

In Step 606, values for dimensions of touch are obtained for each of the relevant products. The values may be retrieved from the database, where the dimensions of touch are stored for each of the products. Assuming that there are K relevant products, and that there are D dimensions of touch, the selected D values would be obtained for each of the K relevant products. As previously discussed with reference to FIGS. 1 and 2, the values for the dimensions of touch for the products were previously measured using the haptic measurement system.

In Step 608, haptic descriptors are displayed in the user interface. For example, the user interface may show the terms "soft", "firm", "smooth", "warm", "cool", and "fuzzy", represented in the database as discussed with reference to FIG. 1. The haptic descriptors may be provided as a list, or in any other format.

In Step 610, weights may be obtained for the haptic descriptors displayed in Step 608. The customer may be offered a menu of haptic descriptors and may be asked to assign a relative weight to each of the haptic descriptors. For example, a "0" weight would suggest that a haptic descriptor is irrelevant (and may be removed from consideration), whereas a "1" weight would suggest that the haptic descriptor is highly relevant to the customer. The weights may be assigned by any of several methods such as putting the haptic descriptors in order of importance, assigning a percentage value, arranging them on a visual-analog scale, or other methods that are well-known in the graphical arts.

In Step 612, haptic descriptor values are computed for the subset of the haptic descriptors, for each of the relevant products. To do so, the values for the dimensions of touch associated with a relevant product are processed using the relationship specified for the haptic descriptors, in the database. This operation may be performed for each of the relevant products. A number J of haptic descriptor values may be obtained for each of the K relevant products.

In Step 614, a haptic desirability is computed for each of the relevant products, based on the haptic descriptor values. The haptic desirability for a particular relevant product may be a sum of the J haptic descriptor values H associated with that product, with each of the haptic descriptor values H weighted by the corresponding weight W obtained in Step 610, $V_k = \Sigma_{j \in J} W_j H_{k,j}$, where $V_k$ is the haptic desirability of product k. Alternatively, other combinations, different from the sum may be used without departing from the disclosure. The haptic desirability may be computed for all K relevant products.

In Step 616, the relevant products may be reordered in the user interface, based on their haptic desirability. The relevant products may be reordered in a descending order. The order of presentation of the relevant products could also be influenced additionally by the etailer's goals such as maximizing profit margins, clearing inventory, facilitating shipping, etc. It may not be necessary or desirable to inform the customer of the various factors contributing to the order of presentation. An example of the reordering is provided in FIGS. 11B and 11C. FIG. 11B shows products prior to the reordering (for example, after execution of Step 604), and FIG. 11C shows the same products after the reordering.

In Step 618, based on the customer's input, the search for a product may be refined or not. The search may be refined if the customer decides to enter a refined set of search criteria. In this case, the execution of the method may return to Step 600. Alternatively, the execution of the method may terminate, for example, by the customer selecting one or more of the relevant products for purchase or simply by abandoning the search. If the customer decides to purchase one or more of the products, the decision to purchase may have been influenced by the ordering of the relevant products, governed by the haptic desirability as initially specified by the customer.

Figure 7:
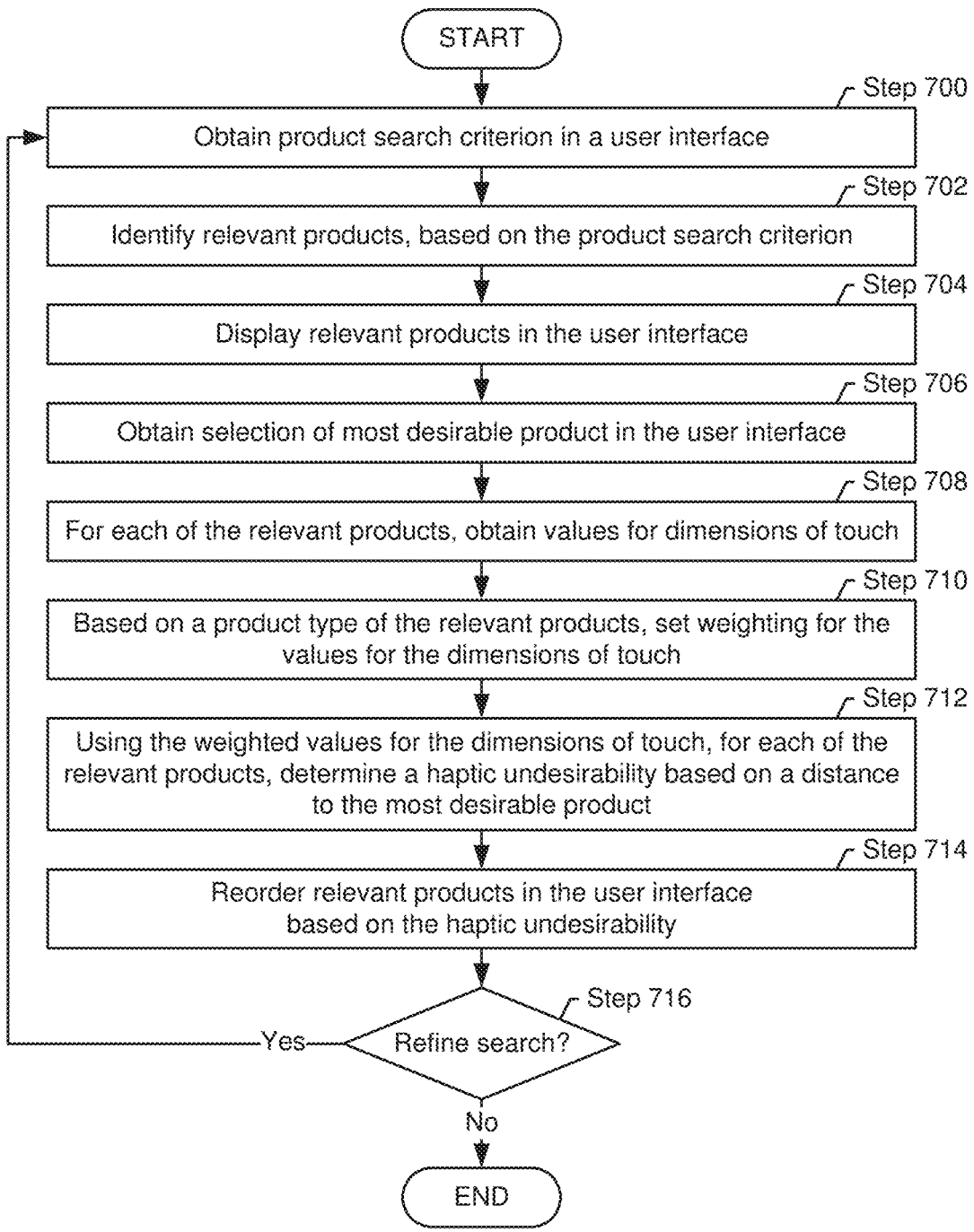
FIG. 7 shows a flowchart describing a method for reordering graphical renderings of individual products that a customer is considering to purchase, according to the similarity of their overall haptic properties to those of one specific product identified by the customer, in accordance with one or more embodiments of the disclosure.

FIG. 7 shows a flowchart describing a method for reordering graphical renderings of individual products that a customer is considering to purchase, according to the similarity of their overall haptic properties to those of one specific product identified by the customer, in accordance with one or more embodiments of the disclosure. The customer may be offered the opportunity to identify one specific product that, in their experience, has the desired haptic properties for the relevant products, which may then be reordered based on their haptic distance from the specifically desired product. The list of relevant products may then be presented to customer as illustrated in FIGS. 11B and 11C and discussed in more detail below. Reordering the graphical renderings has the advantage that it requires no additional graphics or display space beyond the usual description of each product. The haptic desirability described herein to determine the reordering may be combined with other information about the customer's known or likely preferences regarding features such as price, color, style, etc. that may be known to or inferred by the etailer on the basis of the customer's prior shopping history, demographics or other information that is available to the etailer, according to methods that are well-known to practitioners of the art of ecommerce.

In Step 700, at least one product search criterion is obtained in the user interface for example when a customer accesses the sales portal of an etailer. The at least one product search criterion may be received from a customer using the input device to define search criteria that identify the range of products that he/she is interested to purchase. The at least one product search criterion may have any degree of specificity. For example, the customer may simply want to perform a search for furniture using the search criterion "patio furniture". In another example, the customer wants to be more specific and specifies the search criteria "patio furniture" and "sofa". Other search criteria may specify a price, a material, a style, a color, etc. Any search criterion or combination of search criteria may be received in Step 700, without departing from the disclosure. The at least one search criterion may include free text, selections via checkboxes, menus, etc.

In Step 702, one or more relevant products are identified based on the at least one search criterion. The identification of relevant products may involve a search of the products in the database that fit the at least one search criterion.

In Step 704, the one or more relevant products are displayed in the user interface, enabling the customer to review the identified relevant products. Any number of relevant products, e.g., K relevant products may be displayed. The user may investigate the relevant products by reviewing photos, videos, descriptive text, reviews, etc., of the relevant product(s).

In Step 706, a selection of the most desirable product is obtained, in the user interface. To make the selection, the customer may select one of the relevant products on display or any other product for which the database provides values of the dimensions of touch. The customer's selection may be based on his or her belief or knowledge that the selected product has the most desirable haptic properties. The customer's knowledge or belief may be based on a previous experience with the product, reviews, advertisements, etc.

In Step 708, values for dimensions of touch are obtained for each of the relevant products including the most desirable product. The values may be retrieved from the database, where the dimensions of touch are stored for each of the products. Assuming that there are K relevant products, and that there are D dimensions of touch, the selected D values would be obtained for each of the K relevant products. As previously discussed with reference to FIGS. 1 and 2, the values for the dimensions of touch for the products were previously measured using the haptic measurement system.

In Step 710, based on a product type of the relevant products, a weighting is set for the values for the dimensions of touch. Setting the weighting may include selecting a set of weights based on the product type. The set of weights may be selected from multiple sets of weights for multiple product types, stored in a database. Each of the sets of weights may have been previously established to reflect the relative benefit of each of the plurality of dimensions of touch for the haptic desirability of the product type. More specifically, the set of weights for a product type may have been determined to reflect the relative value of each dimension of touch for the haptic desirability of the type of relevant products, as determined from common statistical and/or analytical methods that are subsequently discussed. For example a principal components analysis may be used. More specifically, the principal component analysis may be applied to determine which of the dimensions in the multi-dimensional representations account for the majority of the differences in desirability/undesirability among products of a particular type, using data from customer reviews, product returns, focus groups or other sources of information about consumer preferences. Alternatively, an analysis of variance including multiple-dimension ANOVA techniques like two-way ANOVA, in which the two factors may be instrument-based dimensions and human preferences may be used. Weighting of individual dimensions or selection of the dimensions that have an interaction may be appropriate. Sidak's multiple comparisons post-hoc test may be used to identify the specific dimensions and give p-values for each. There are a wide range of applicable analysis techniques including both nonparametric statistics (Anderson-Darling test, Statistical bootstrap methods, Cochran's Q, Cohen's kappa, Friedman two-way analysis of variance by ranks, Kaplan-Meier, Kendall's tau, Kendall's W, Kolmogorov-Smirnov test, Kruskal-Wallis one-way analysis of variance by ranks, Kuiper's test, Log rank test, Mann-Whitney U or Wilcoxon rank sum tests, McNemar's test, Median test, Pitman's permutation test, Rank products, Siegel-Tukey test, Sign test, Spearman's rank correlation coefficient, Squared ranks test:, Tukey-Duckworth test:, Wald-Wolfowitz runs test, Wilcoxon signed-rank test) and parametric statistics (Chi-squared G-test, Kolmogorov-Smirnov, Anderson-Darling, Lilliefors, Jarque-Bera, Normality (Shapiro-Wilk), Likelihood-ratio test, Model selection, Aikakie Information Criterion, Bayesian Information criterion, Wilcoxon, Hodges-Lehmann estimator, Mann-Whitney, nonparametric ANOVA (Kruskal-Wallis or Friedman), or Jonckheere-Terpstra), any of which may be applicable given appropriate assumptions about the overall sample distribution.

To further illustrate the concept of product types and weights, consider for example the product type "pillow". When purchasing a pillow, customers may mostly care about haptic characteristics such as "texture" and "softness". A desirable texture and softness may translate to certain dimensions of touch being more relevant than others. Accordingly, a higher weight would be set for the dimensions of touch that affect texture and softness to a significant extent, whereas a lower weight would be set for the dimensions of touch that affect texture and softness to a lesser extent. In contrast, very different dimensions of touch may be relevant for other product types such as the product type "kitchen countertop".

D weights W may be obtained to scale the D dimensions of touch. A "0" weight would suggest that the associated dimension of touch is irrelevant for the haptic desirability of the product type, whereas a "1" weight would suggest that the associated dimension of touch is highly relevant. The weights may be multiplicatively applied to the values for the dimensions of touch.

In Step 712, using the weighted values for the dimensions of touch, a distance between most desirable product and each of the relevant products may be computed. The distance may be an Euclidian distance representing the haptic undesirability of the relevant product, $U_k = \Sigma_{i=1 \text{ to } D} W_i(D_{k,i} - D_{N,i})^2$, where $U_k$ is the undesirability of product k., based on the distances between the dimensions of touch for the relevant products $D_k$ and the most desirable product $D_N$. A larger distance to the most desirable product may indicate a higher undesirability. K distances may be computed for the K relevant products.

In Step 714, the relevant products may be reordered in the user interface, based on their haptic undesirability. The relevant products may be reordered in an ascending order. The order of presentation of the relevant products could also be influenced additionally by the etailer's goals such as maximizing profit margins, clearing inventory, facilitating shipping, etc. It may not be necessary or desirable to inform the customer of the various factors contributing to the order of presentation. An example of the reordering is provided in FIGS. 11B and 11C. FIG. 11B shows products prior to the reordering (for example, after execution of Step 704), and FIG. 11C shows the same products after the reordering.

In Step 716, based on the customer's input, the search for a product may be refined or not. The search may be refined if the customer decides to enter a refined set of search criteria. In this case, the execution of the method may return to Step 700. Alternatively, the execution of the method may terminate, for example, by the customer selecting one or more of the relevant products for purchase or simply by abandoning the search. If the customer decides to purchase one or more of the products, the decision to purchase may have been influenced by the ordering of the relevant products, governed by the haptic desirability (or undesirability) in comparison to the most desirable product.

Figure 8:
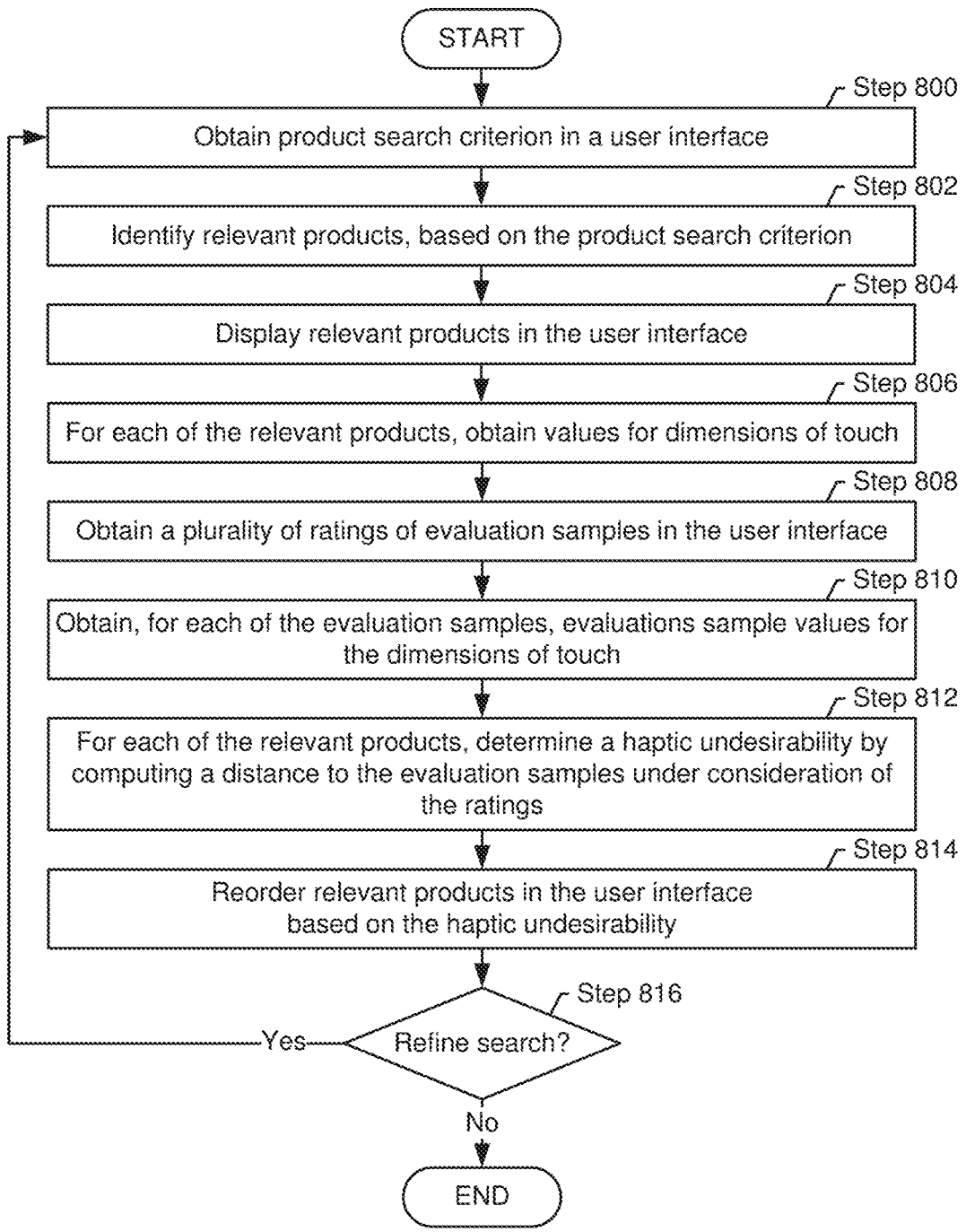
FIG. 8 shows a flowchart describing a method for reordering graphical renderings of individual products that a customer is considering to purchase, according to the relationship between their overall haptic properties and those of a multiplicity of materials, each of whose overall haptic properties has been assigned a relative value of desirability by the customer, in accordance with one or more embodiments of the disclosure.

FIG. 8 shows a flowchart describing a method for reordering graphical renderings of individual products that a customer is considering to purchase, according to the relationship between their overall haptic properties and those of a multiplicity of materials, each of whose overall haptic properties has been assigned a relative value of desirability by the customer. The customer may be asked to assign a rating of the haptic desirability or undesirability of each item in a set of evaluation samples with reference to the desired haptic properties for the relevant products, which may then be reordered so that their order reflects their haptic similarity to desirable samples and dissimilarity to undesirable samples. The list of relevant products may then be presented to customer as illustrated in FIGS. 11B and 11C and discussed in more detail below. Reordering the graphical renderings has the advantage that it requires no additional graphics or display space beyond the usual description of each product. The haptic desirability described herein to determine the reordering may be combined with other information about the customer's known or likely preferences regarding features such as price, color, style, etc. that may be known to or inferred by the etailer on the basis of the customer's prior shopping history, demographics or other information that is available to the etailer, according to methods that are well-known to practitioners of the art of ecommerce.

In Step 800, at least one product search criterion is obtained in the user interface for example when a customer accesses the sales portal of an etailer. The at least one product search criterion may be received from a customer using the input device to define search criteria that identify the range of products that he/she is interested to purchase. The at least one product search criterion may have any degree of specificity. For example, the customer may simply want to perform a search for furniture using the search criterion "patio furniture". In another example, the customer wants to be more specific and specifies the search criteria "patio furniture" and "sofa". Other search criteria may specify a price, a material, a style, a color, etc. Any search criterion or combination of search criteria may be received in Step 800, without departing from the disclosure. The at least one search criterion may include free text, selections via checkboxes, menus, etc.

In Step 802, one or more relevant products are identified based on the at least one search criterion. The identification of relevant products may involve a search of the products in the database that fit the at least one search criterion.

In Step 804, the one or more relevant products are displayed in the user interface, enabling the customer to review the identified relevant products. Any number of relevant products, e.g., K relevant products may be displayed. The user may investigate the relevant products by reviewing photos, videos, descriptive text, reviews, etc., of the relevant product(s).

In Step 806, values for dimensions of touch are obtained for each of the relevant products. The values may be retrieved from the database, where the dimensions of touch are stored for each of the products. Assuming that there are K relevant products, and that there are D dimensions of touch, the selected D values would be obtained for each of the K relevant products. As previously discussed with reference to FIGS. 1 and 2, the values for the dimensions of touch for the products were previously measured using the haptic measurement system.

In Step 808, ratings are obtained for evaluation samples. The customer using user interface may select one or more evaluation samples from options displayed in the user interface. The displayed options may include items from one or more swatch books consisting of physical materials supplied previously to the customer and/or items from one or more virtual swatch books, each consisting of one or more names of common materials whose haptic properties are likely to be familiar to the customer. For each reference material in the physical or virtual swatch book, the customer may be asked to identify whether the haptic properties of that reference material would be desirable or undesirable for the product to be purchased. A rating by the customer may range from positive to negative to enable the customer to positively or negatively rater an evaluation sample. A rating may be in a range of, for example, −1 (dislike) through 0 (neutral) to +1 (like). A rating may be provided using a slider on a visual analog scale, by entering a number, or using any other method. A number S of ratings may be available based on the number of evaluation samples that the customer chooses to evaluate.

In Step 810, values for dimensions of touch are obtained for each of the rated evaluation samples. The values may be retrieved from the database, where the dimensions of touch are stored for each of the evaluation samples. Assuming that there are S evaluation samples for which ratings were obtained, and that there are D dimensions of touch, D values would be obtained for each of the S evaluation samples. As previously discussed with reference to FIGS. 1 and 2, the values for the dimensions of touch for the products were previously measured using the haptic measurement system.

In Step 812, a haptic undesirability is obtained for each of the relevant products. The undesirability of a relevant product is represented by a distance between the relevant product and the evaluation samples under consideration of the ratings. A larger distance to the most desirable product may indicate a higher undesirability. More specifically, the undesirability of a relevant product is represented by the sum of the Euclidean distances in the multidimensional space of dimensions of touch between the relevant product and the one or more of the selected evaluation samples for which Customer has assigned a rating. Additional details are provided below with reference to FIG. 10. K distances may be computed for the K relevant products, using the D number of dimensions of touch and the S number of weighted evaluation samples. In one embodiment of the disclosure, the mathematical expression for the undesirability U is: $U_k = \Sigma_{s \in S} R_s (\Sigma_{i=1 \text{ to } D} (D_{k,i} - D_{s,i})^2)^{0.5}$, where R is the rating, $D_{k,i}$ is the i-th dimension of touch for a relevant product, and $D_{s,i}$ is the i-th dimension of touch for an evaluation sample. S evaluation samples are considered, D dimensions of touch are considered, and the number of relevant products is K.

In Step 814, the relevant products may be reordered in the user interface, based on their haptic undesirability. The relevant products may be reordered in an ascending order. The order of presentation of the relevant products could also be influenced additionally by the etailer's goals such as maximizing profit margins, clearing inventory, facilitating shipping, etc. It may not be necessary or desirable to inform the customer of the various factors contributing to the order of presentation. An example of the reordering is provided in FIGS. 11B and 11C. FIG. 11B shows products prior to the reordering (for example, after execution of Step 804), and FIG. 11C shows the same products after the reordering.

In Step 816, based on the customer's input, the search for a product may be refined or not. The search may be refined if the customer decides to enter a refined set of search criteria. In this case, the execution of the method may return to Step 800. Alternatively, the execution of the method may terminate, for example, by the customer selecting one or more of the relevant products for purchase or simply by abandoning the search. If the customer decides to purchase one or more of the products, the decision to purchase may have been influenced by the ordering of the relevant products, governed by the haptic desirability (or undesirability) as expressed by the evaluation samples rated by the customer.

Figure 9:
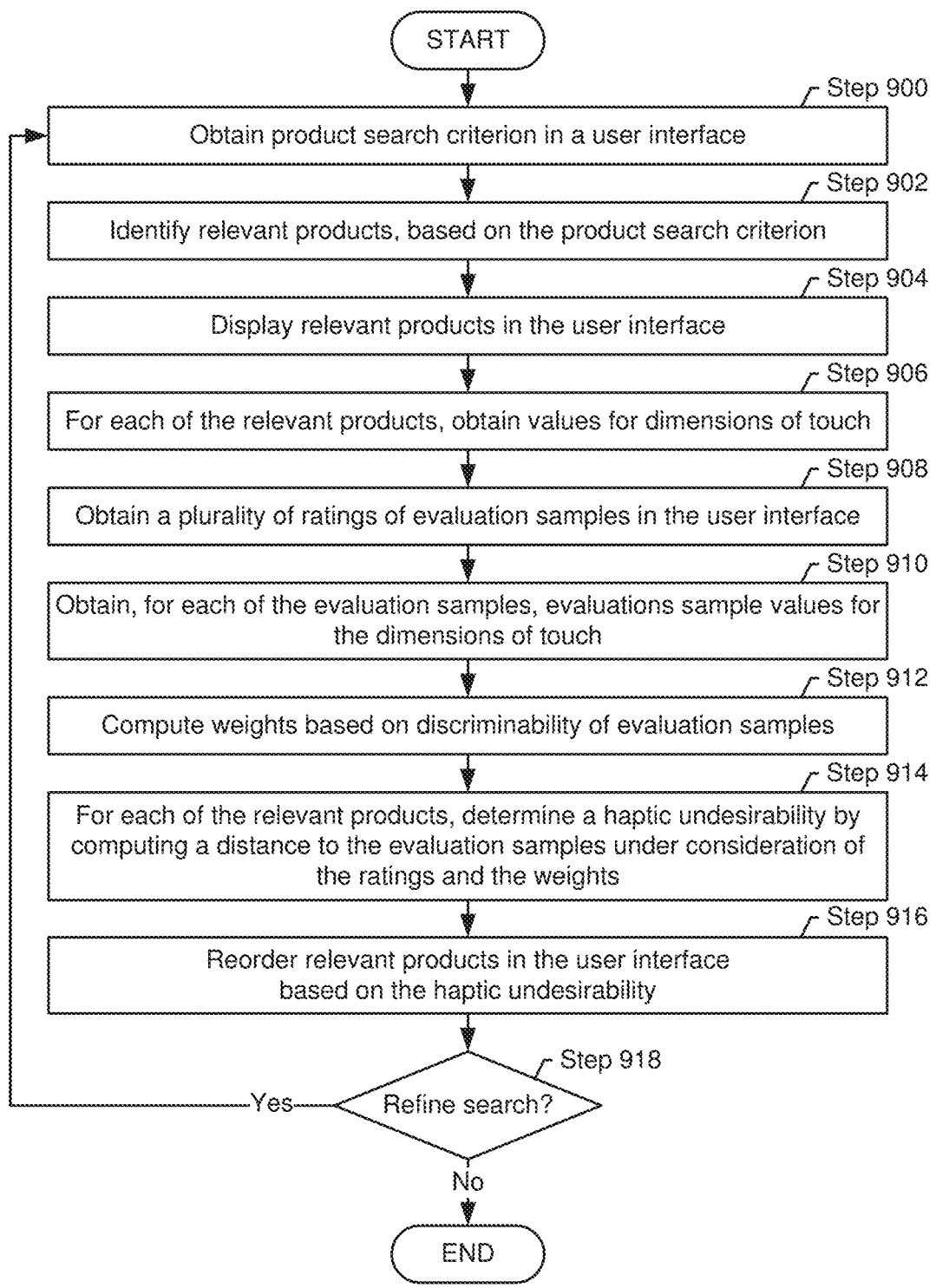
FIG. 9 shows a flowchart describing a method for reordering graphical renderings of individual products that a customer is considering to purchase, according to the relationship between their overall haptic properties and those of a multiplicity of materials, each of whose overall haptic properties has been assigned a relative value of desirability by the customer, wherein the relationship is computed according to weighted values for a multiplicity of dimensions and the weights are based upon the degree to which each dimension contributes to the relative desirability of the materials, in accordance with one or more embodiments of the disclosure.

FIG. 9 shows a flowchart describing a method for reordering graphical renderings of individual products that a customer is considering to purchase, according to the relationship between their overall haptic properties and those of a multiplicity of materials, each of whose overall haptic properties has been assigned a relative value of desirability by the customer, wherein the relationship is computed according to weighted values for a multiplicity of dimensions and the weights are based upon the degree to which each dimension contributes to the relative desirability of the materials. The customer may be asked to assign a ranking of the haptic desirability or undesirability of each item in a set of evaluation samples with reference to the desired haptic properties for the relevant products, which may then be reordered so that their order reflects their haptic similarity to desirable samples and dissimilarity to undesirable samples according to the degree to which each dimension of touch is a differentiating factor in the ranking of the haptic desirability or undesirability. The list of relevant products may then be presented to customer as illustrated in FIGS. 11B and 11C and discussed in more detail below. Reordering the graphical renderings has the advantage that it requires no additional graphics or display space beyond the usual description of each product. The haptic desirability described herein to determine the reordering may be combined with other information about the customer's known or likely preferences regarding features such as price, color, style, etc. that may be known to or inferred by the etailer on the basis of the customer's prior shopping history, demographics or other information that is available to the etailer, according to methods that are well-known to practitioners of the art of ecommerce.

In Step 900, at least one product search criterion is obtained in the user interface for example when a customer accesses the sales portal of an etailer. The at least one product search criterion may be received from a customer using the input device to define search criteria that identify the range of products that he/she is interested to purchase. The at least one product search criterion may have any degree of specificity. For example, the customer may simply want to perform a search for furniture using the search criterion "patio furniture". In another example, the customer wants to be more specific and specifies the search criteria "patio furniture" and "sofa". Other search criteria may specify a price, a material, a style, a color, etc. Any search criterion or combination of search criteria may be received in Step 900, without departing from the disclosure. The at least one search criterion may include free text, selections via checkboxes, menus, etc.

In Step 902, one or more relevant products are identified based on the at least one search criterion. The identification of relevant products may involve a search of the products in the database that fit the at least one search criterion.

In Step 904, the one or more relevant products are displayed in the user interface, enabling the customer to review the identified relevant products. Any number of relevant products, e.g., K relevant products may be displayed. The user may investigate the relevant products by reviewing photos, videos, descriptive text, reviews, etc., of the relevant product(s).

In Step 906, values for dimensions of touch are obtained for each of the relevant products. The values may be retrieved from the database, where the dimensions of touch are stored for each of the products. Assuming that there are K relevant products, and that there are D dimensions of touch, the selected D values would be obtained for each of the K relevant products. As previously discussed with reference to FIGS. 1 and 2, the values for the dimensions of touch for the products were previously measured using the haptic measurement system.

In Step 908, ratings are obtained for evaluation samples. The customer using user interface may select one or more evaluation samples from options displayed in the user interface. The displayed options may include items from one or more swatch books consisting of physical materials supplied previously to the customer and/or items from one or more virtual swatch books, each consisting of one or more names of common materials whose haptic properties are likely to be familiar to the customer. For each reference material in the physical or virtual swatch book, the customer may be asked to identify whether the haptic properties of that reference material would be desirable or undesirable for the product to be purchased. A rating by the customer may range from positive to negative to enable the customer to positively or negatively rater an evaluation sample. A rating may be in a range of, for example, −1 (dislike) through 0 (neutral) to +1 (like). A rating may be provided using a slider on a visual analog scale, by entering a number, or using any other method. A number S of ratings may be available based on the number of evaluation samples that the customer chooses to evaluate.

In Step 910, values for dimensions of touch are obtained for each of the rated evaluation samples. The values may be retrieved from the database, where the dimensions of touch are stored for each of the evaluation samples. Assuming that there are S evaluation samples for which ratings were obtained, and that there are D dimensions of touch, D values would be obtained for each of the S evaluation samples. As previously discussed with reference to FIGS. 1 and 2, the values for the dimensions of touch for the products were previously measured using the haptic measurement system.

In Step 912, weights may be computed based on the discriminability of the evaluation samples. More specifically, for each dimension of touch, a weight is calculated according to the degree to which the dimensions of touch contributes to the discriminability of the selected evaluation samples as rated by customer. Higher weights are assigned to dimensions of touch that contribute more to the discriminability of the evaluation samples, in comparison to other dimensions of touch that contribute less. A detailed description is provided below with reference to FIG. 10.

In Step 914, a haptic undesirability is obtained for each of the relevant products. The undesirability of a relevant product is represented by a distance between the relevant product and the evaluation samples under consideration of the ratings and the weights. A larger distance to the most desirable product may indicate a higher undesirability. More specifically, the undesirability of a relevant product is represented by the sum of the weighted Euclidean distances in the multidimensional space of dimensions of touch between the relevant product and the one or more of the selected evaluation samples for which Customer has assigned a rating. Additional details are provided below with reference to FIG. 10. K distances may be computed for the K relevant products, using the D number of dimensions of touch and the S number of weighted evaluation samples. In one embodiment of the disclosure, the mathematical expression for the undesirability U is: $U_k = \Sigma_{s \in S} R_s (\Sigma_{i=1 \text{ to } D} W_i (D_{k,i} - D_{s,i})^2)^{0.5}$, where R is the rating, W is the weighting, $D_{k,i}$ is the i-th dimension of touch for a relevant product, and $D_{s,i}$ is the i-th dimension of touch for an evaluation sample. S evaluation samples are considered, D dimensions of touch are considered, and the number of relevant products is K.

In Step 916, the relevant products may be reordered in the user interface, based on their haptic undesirability. The relevant products may be reordered in an ascending order. The order of presentation of the relevant products could also be influenced additionally by the etailer's goals such as maximizing profit margins, clearing inventory, facilitating shipping, etc. It may not be necessary or desirable to inform the customer of the various factors contributing to the order of presentation. An example of the reordering is provided in FIGS. 11B and 11C. FIG. 11B shows products prior to the reordering (for example, after execution of Step 904), and FIG. 11C shows the same products after the reordering.

In Step 918, based on the customer's input, the search for a product may be refined or not. The search may be refined if the customer decides to enter a refined set of search criteria. In this case, the execution of the method may return to Step 900. Alternatively, the execution of the method may terminate, for example, by the customer selecting one or more of the relevant products for purchase or simply by abandoning the search. If the customer decides to purchase one or more of the products, the decision to purchase may have been influenced by the ordering of the relevant products, governed by the haptic desirability (or undesirability) as expressed by the evaluation samples rated by the customer.

The methods described in FIGS. 3, 4, 5, 6, 7, 8, and 9 are not limited to the described steps. Many variants are within the scope of the disclosure. For example, by changing the sign and range of the weights and other details, the methods may be used to rank-order according to most desirable as opposed to least undesirable. Further, a complete set of haptic dimensions or a subset of principal dimensions may be used. Instead of eliminating dimensions according to their relative contribution to differences in desirability/undesirability among the materials in the swatch book, the principal component value for each dimension may be used to scale that dimension in the hyperspace of all dimensions. Euclidean distances computed in such a rescaled hyperspace would then reflect the relative value of each dimension in accounting for the range of customer preferences among the swatch materials.

Further, variations of the described visualization of haptic characteristics may be implemented, without departing from the disclosure. A comparison of different products may be provided by displaying information about the degree of haptic desirability/undesirability and haptic similarity of the products via a percentage, scaled distance, ordinal ranking, or ratings on each salient haptic dimension and/or of the overall haptic characteristics. Embodiments of the disclosure may further include implicitly display information about the relationship via changing the spatial position of the products, e.g., reordering them on an ordinal scale, or placing them on a one-dimension continuum or multi-dimensional space that relates their position to similarity, or otherwise modifying the information displayed about the product: adjusting the color, hue, saturation, gamma, etc. of the product, lengthening or shortening the amount of texts, increasing the image size, or adding other elements that highlight the product, such as banners or notifications that highlight one or more particular samples.

Various embodiments, as described in FIGS. 3, 4, 5, 6, 7, 8, and 9 have one or more of the following advantages: One or more embodiments may assist a customer in identifying a product to be purchased. Ordering products according to haptic desirability/undesirability and/or displaying easy-to-read graphical visualizations of the degree of desirable/undesirable haptic characteristics may enable the customer to identify a product that is likely to meet the customer's haptic preferences.

Embodiments of the disclosure reconcile verbal descriptions of tactile feel that tend to be interpreted subjectively by the customer and may have different meanings for different types of products with objective measures of tactile dimensions. Embodiments of the disclosure allow the use of the objective measurements to identify products that are similar to a product that the customer has already purchased and/or to reference materials provided to the customer as physical samples constituting a physical swatch book or identified by verbal descriptions constituting a virtual swatch book (e.g. "silk scarf," "washed jeans," "flannel blanket," etc.).

Figure 10:
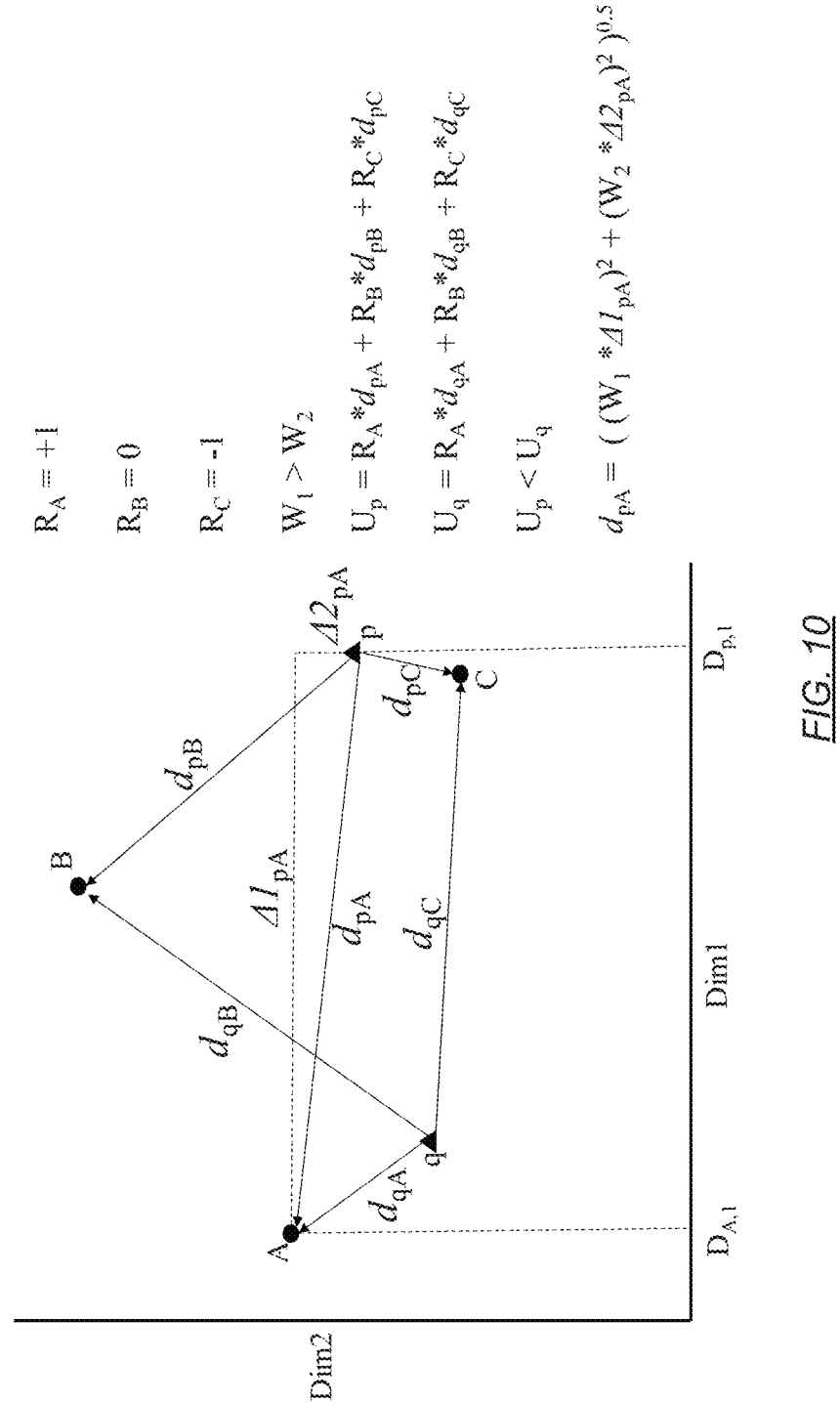
FIG. 10 shows a hypothetical example of a graph illustrating the distribution of distinguishing tactile properties, in accordance with one or more embodiments of the disclosure.

FIG. 10 shows a hypothetical example of a graph (1000) illustrating the distribution of distinguishing tactile properties, in accordance with one or more embodiments of the disclosure. For a swatch book consisting of three materials (A, B and C) and two dimensions of touch (Dim1 and Dim2) in the hypothetical example, the graph (1000) illustrates the distribution of their distinguishing tactile properties. Also plotted are the tactile properties of the materials denoted as p and q that are actually available for the consumer product to be purchased (e.g. two fabrics for upholstering a sofa). Our method includes a process to rate the available materials by considering how close they are to desirable swatch materials and how far they are from undesirable swatch materials. In this example, we assume that material A has a highly desirable rating $R_A = +1$, material C has a highly undesirable rating $R_C = -1$, and material B has neutral rating $R_B=0$. By inspection, it is obvious that the tactile property plotted as Dim1 accounts for most of these ratings as compared to Dim2, so Dim1 should be accorded a greater weight $W_1$ than weight $W_2$ for Dim2. Methods are described below to compute the appropriate weights statistically. In the embodiment depicted in FIG. 10, the weighted Euclidean distance d between each available material and each swatch material may be computed in the two dimensional space and this distance may be multiplied by the rating R for each swatch material, as described in Step 914 of the flowchart in FIG. 9. For each available material, the undesirability U can be computed as the sum over all of the rated swatches of the weighted Euclidean distance of the swatch from the available material times the rating. Available materials that are perceptually remote from highly desirable swatch materials generate a large positive contribution to the sum; available materials that are perceptually remote from highly undesirable materials generate a large negative contribution to the sum. The available material that is most likely to satisfy the customer will be the one with the lowest sum, i.e. the least undesirable. In the hypothetical example illustrated graphically in FIG. 10, two principal dimensions denoted as Dim1 and Dim2 are visualized. While two principal dimensions are particularly easy to visualize, the underlying concepts may be applied mathematically to any number of principal dimensions.

Figure 11A:
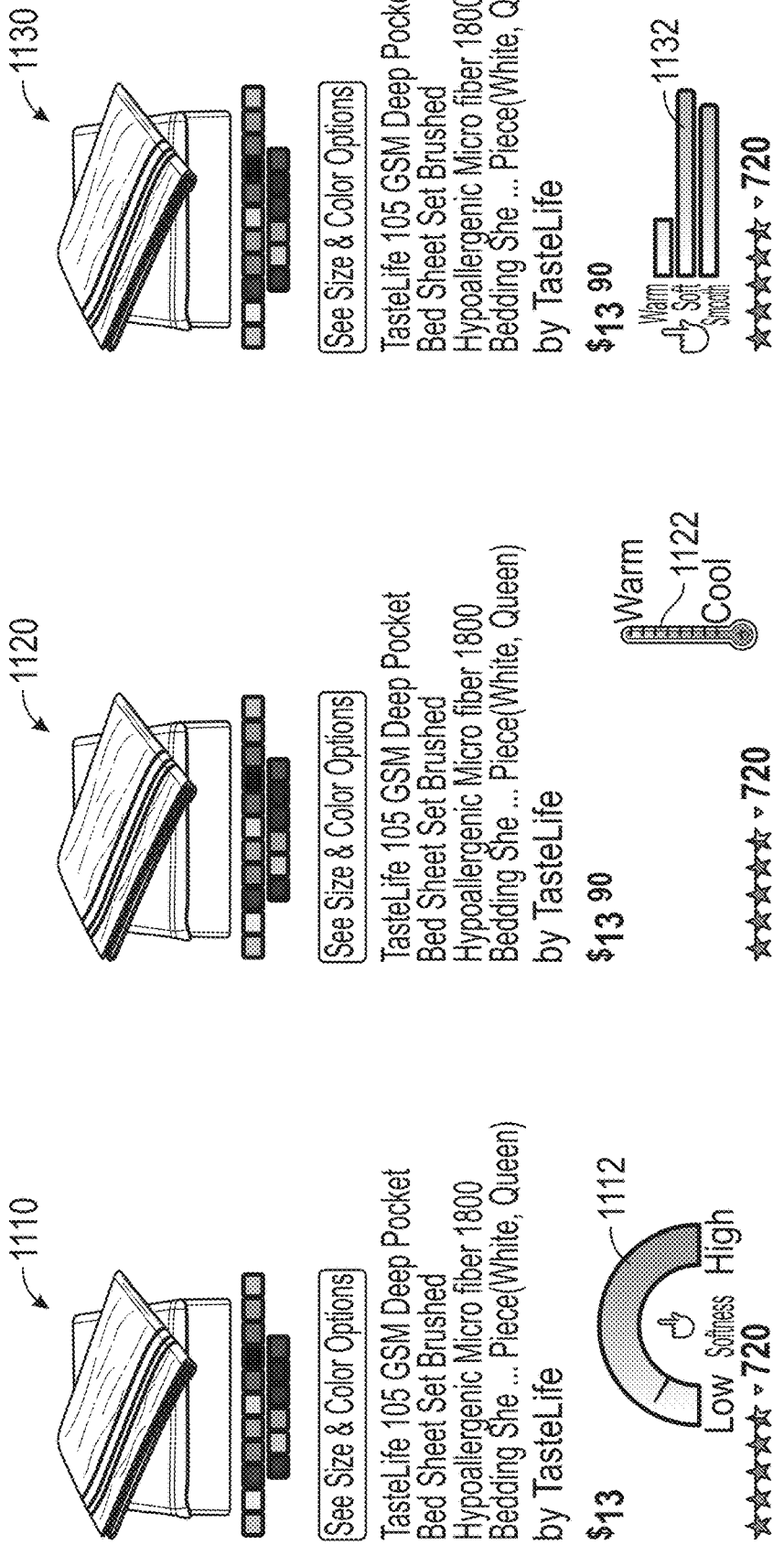
FIGS. 11A, 11B, and 11C show hypothetical examples of graphical renderings of products on offer that make use of information about haptic properties in accordance with one or more embodiments of the disclosure.
Figure 11B:
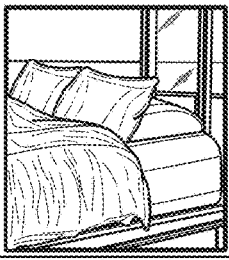
Figure 11C:
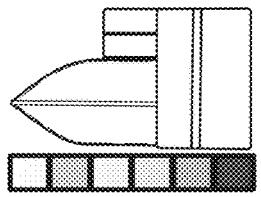

FIG. 11A shows three different graphical forms (1110, 1120, 1130) that may display values of dimensions of touch as described in FIG. 3 or haptic descriptors as described in FIG. 4. The leftmost and center panels show two possible graphical forms to display single values in association with a product on offer using graphic indicators (1112, 1122). The rightmost panel shows an example of a bar graph display (1132) suitable for showing values associated with multiple dimensions of touch or multiple haptic descriptors that may be selected for display by the customer or the etailer. FIG. 11B shows a typical graphical display (1150) in which multiple products on offer in response to search criteria are ordered by descending price. FIG. 11C provides a graphical display (1160) showing the same products on offer reordered according to their relative values of the haptic descriptor for "Softness" as computed by the method illustrated in FIG. 5. Alternatively, the reordering may be according to their relative haptic desirability as computed by the method illustrated in FIG. 6, or to the similarity of their overall haptic properties to those of one specific product identified by the customer as described in FIG. 7, or according to the relationship between their overall haptic properties and those of a multiplicity of evaluation samples as computed by the methods illustrated in FIG. 8 or FIG. 9.

Figure 12:
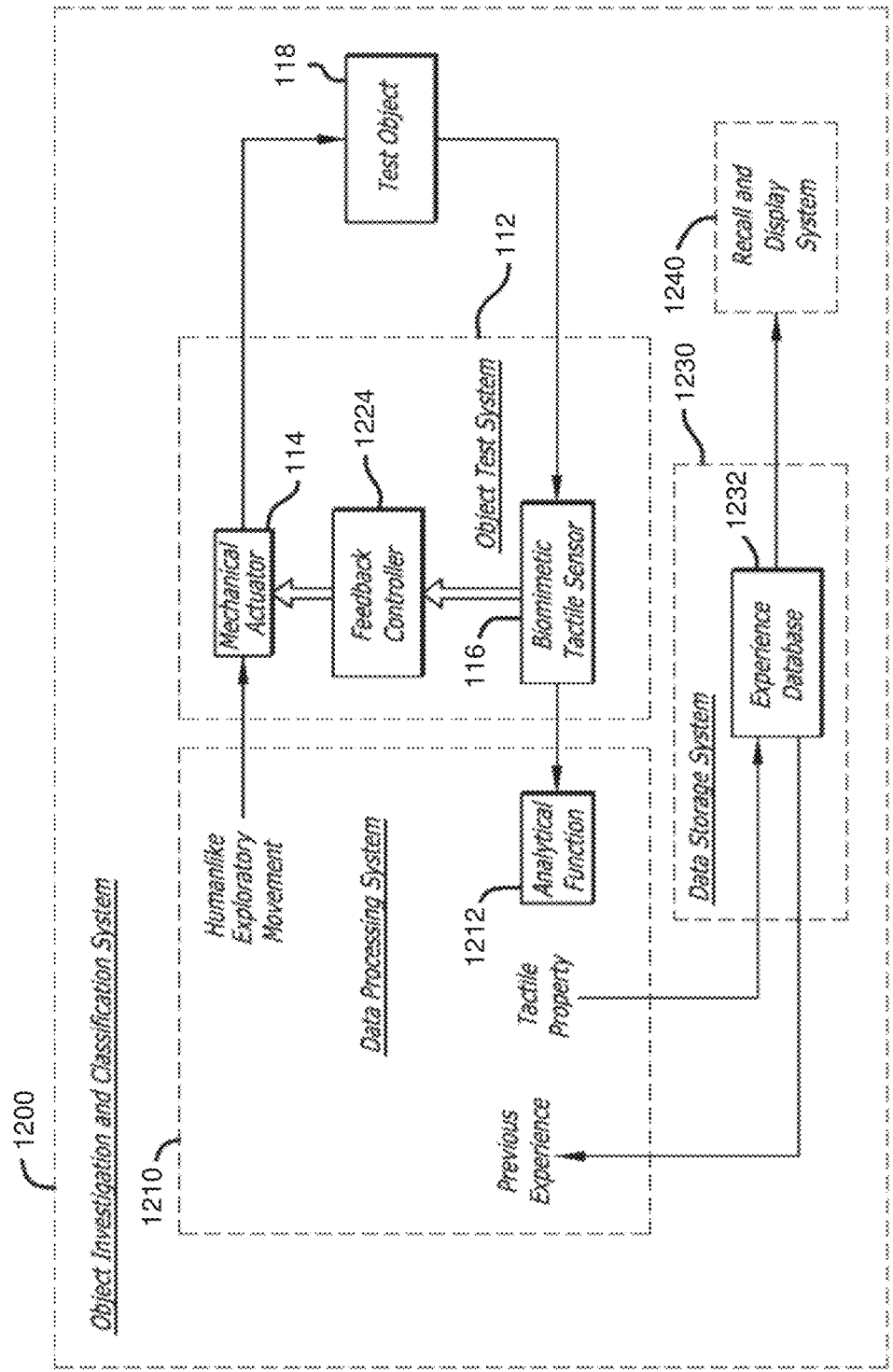
FIG. 12 shows an object investigation and classification system in accordance with one or more embodiments of the disclosure.

FIG. 12 illustrates an example of an object investigation and classification system (1200) that may have the ability to capture tactile information from a test object (118), store that information in a database, and recall and display that information to a human observer.

Referring to FIG. 12, the object investigation and classification system (1200) may include a data processing system (1210), object test system (112), data storage system (1230), and recall and display system (1240).

Still referring to FIG. 12, the object test system (112) may contain one or more mechanical actuators (114), one or more sensors, and one or more feedback controllers (1224). One or more of the one or more sensors may be biomimetic tactile sensors (116) that have mechanical properties and sensory capabilities similar to the human fingertip, such as, but not limited to, the BioTac (SynTouch Inc., Montrose, CA). Other sensors may also be used to detect mechanical responses such as, but not limited to, load cells, strain gauges, position encoders, Hall-effect sensors, and related devices familiar to those skilled in the art of sensory instrumentation of mechanical systems.

Still referring to FIG. 12, the one or more mechanical actuators (114) may move a biomimetic tactile sensor (116) over the test object (118) to elicit mechanical interactions that can be sensed by the biomimetic tactile sensor (116) or other sensors. The movements performed by the mechanical actuators (114) may be humanlike exploratory movements that are sequenced with the ranges of forces and velocities that humans typically employ when exploring objects by touch. The mechanical actuators (114) may be any component designed to cause the biomimetic tactile sensor (116) to interact physically with the test object (118), such as, but not limited to, linear stages or rotary stages and related devices familiar to those skilled in the art of mechanical systems. The mechanical actuators (114) may possess or incorporate mechanical compliance to improve smoothness or humanlike verisimilitude of movement and control of mechanical forces, such as, but not limited to, mechanical actuators that use technology based on pneumatics, hydraulics, springs, or other passive or active compliance familiar to those skilled in the art of mechatronics.

Still referring to FIG. 12, test object (118) may be a surface, material, or other object with tactile properties that can be sensed by the biomimetic tactile sensor (116) or other sensors described above that may otherwise be detectable by human touch.

Still referring to FIG. 12, the feedback controller (1224) may be a proportional-integral-derivative controller that uses information detected by the one or more sensors or biomimetic tactile sensors (116) to control the one or more mechanical actuators (114) using linear or non-linear methods, as well as other feedback control techniques, as familiar to those skilled in the arts of feedback control of mechanical systems. For example, the signals generated by the interaction of the biomimetic tactile sensor (116) and the test object (118) may depend on the amount of force with which the biomimetic tactile sensor (116) is applied to the test object (118) via movements from the mechanical actuators (114). If the biomimetic tactile sensor (116) or other sensors provides information regarding that force, then that information can be provided to the feedback controller (1224) to assure that the mechanical actuators (114) perform the desired humanlike exploratory movement with the desired force. If the mechanical actuators (114) possess compliance, then this control may be simplified as familiar to those skilled in the art of mechatronics.

Still referring to FIG. 12, the data processing system (1210) may be programmed to control the one or more mechanical actuators (114) that may be capable of performing one or more humanlike exploratory movements to interact with a test object (118). The one or more biomimetic tactile sensors (116) or other sensors may be capable of detecting or receiving information that results from this interaction between the one or more biomimetic tactile sensors (116) and test object (118) and deliver this information to the data processing system (1210), which seeks to determine properties of test object (118) from this sensory data using analytical functions (1212). These humanlike exploratory movements may be a predefined sequence of force, velocity or position, or any combinations of these. The humanlike exploratory movements may be any particular humanlike exploratory movement that the one or more actuators can perform with test object (118).

Still referring to FIG. 12, the sensory information received by the one or more biomimetic tactile sensors (116) or other sensors may be used by the data processing system (1210) to compute one or more of tactile properties that result from interactions between the one or more biomimetic tactile sensors (116) and test object (118). If the biomimetic tactile sensor (116) is moved over the surface of test object (118) by the mechanical actuators (114), the tactile properties may be computed from analytical functions (1212) that process the sensory data, such as, but not limited to, the power of measured vibrations to compute the roughness of the surface or other methods, including, but not limited to, those in FIG. 2. The tactile properties may be any particular abstraction of signals from the one or more biomimetic tactile sensors (116).

Still referring to FIG. 12, the data storage system (1230) may contain an experience database (1232) that contains records associating previously executed humanlike exploratory movements with previously computed tactile properties. The experience database (1232) may be a subset of the database of products (132) in FIG. 1. The system (1200) may cause the data storage system (1230) to store values of tactile properties of the test objects (118) that have been determined by one or more object test systems (112).

Figure 13A:
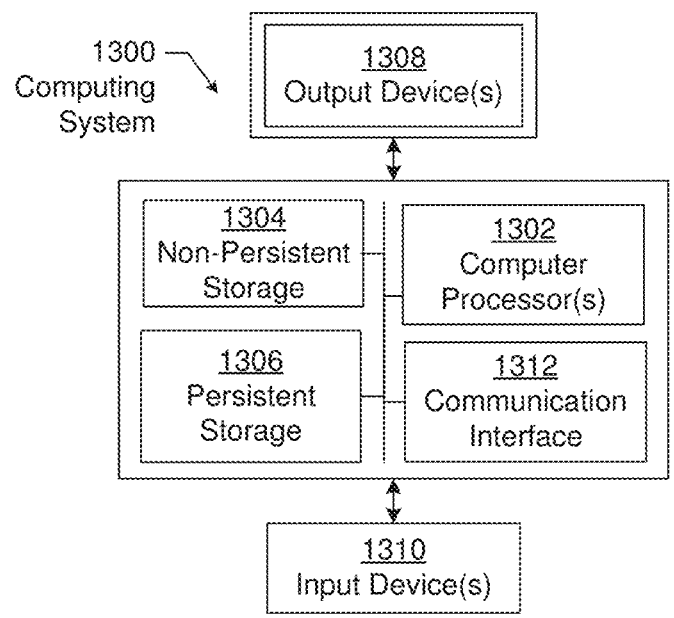
FIGS. 13A and 13B show computing systems in accordance with one or more embodiments of the disclosure.

Embodiments of the disclosure may be implemented on a computing system. Any combination of mobile, desktop, server, router, switch, embedded device, or other types of hardware may be used. For example, as shown in FIG. 13A, the computing system (1300) may include one or more computer processors (1302), non-persistent storage (1304) (e.g., volatile memory, such as random access memory (RAM), cache memory), persistent storage (1306) (e.g., a hard disk, an optical drive such as a compact disk (CD) drive or digital versatile disk (DVD) drive, a flash memory, etc.), a communication interface (1312) (e.g., Bluetooth interface, infrared interface, network interface, optical interface, etc.), and numerous other elements and functionalities.

The computer processor(s) (1302) may be an integrated circuit for processing instructions. For example, the computer processor(s) may be one or more cores or micro-cores of a processor. The computing system (1300) may also include one or more input devices (1310), such as a touchscreen, keyboard, mouse, microphone, touchpad, electronic pen, or any other type of input device.

The communication interface (1312) may include an integrated circuit for connecting the computing system (1300) to a network (not shown) (e.g., a local area network (LAN), a wide area network (WAN) such as the Internet, mobile network, or any other type of network) and/or to another device, such as another computing device.

Further, the computing system (1300) may include one or more output devices (1308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1302), non-persistent storage (1304), and persistent storage (1306). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 13B:
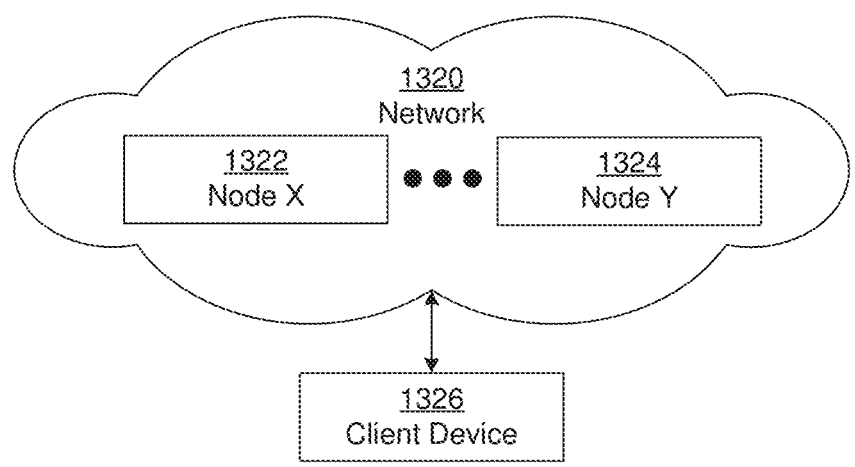

The computing system (1300) in FIG. 13A may be connected to or be a part of a network. For example, as shown in FIG. 13B, the network (1320) may include multiple nodes (e.g., node X (1322), node Y (1324)). Each node may correspond to a computing system, such as the computing system shown in FIG. 13A, or a group of nodes combined may correspond to the computing system shown in FIG. 13A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (1300) may be located at a remote location and connected to the other elements over a network.

Although not shown in FIG. 13B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1322), node Y (1324)) in the network (1320) may be configured to provide services for a client device (1326). For example, the nodes may be part of a cloud computing system. The nodes may include functionality to receive requests from the client device (1326) and transmit responses to the client device (1326). The client device (1326) may be a computing system, such as the computing system shown in FIG. 13A. Further, the client device (1326) may include and/or perform all or a portion of one or more embodiments of the disclosure.

The computing system or group of computing systems described in FIG. 13A and 13B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 13A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 13A, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 13A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 13A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 13A and the nodes and/or client device in FIG. 13B. Other functions may be performed using one or more embodiments of the disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for assisting product selection according to haptic properties, the method comprising:
    measuring values for a plurality of dimensions of touch of test objects using sensing modalities of a haptic measurement system that performs exploratory movements to interact with the test objects;
    storing the values for the plurality of dimensions of touch in a database;
    obtaining at least one product search criterion in a user interface;
    identifying a plurality of relevant products from a plurality of products in a product database, based on the at least one product search criterion;
    displaying the plurality of relevant products in the user interface;
    for each of the plurality of relevant products, obtaining the values for the plurality of dimensions of touch from the database; and
    displaying, in the user interface, information related to haptic properties for each of the plurality of relevant products, based on the values for the plurality of dimensions of touch, comprising:
        displaying a plurality of haptic descriptors in the user interface, wherein each of the plurality of haptic descriptors represents a human haptic perceptual dimension;
        identifying a subset of the plurality of haptic descriptors based on a selection made in the user interface;
        for each of the plurality of relevant products, computing haptic descriptor values for the subset of the plurality of haptic descriptors using the values for the plurality of dimensions of touch; and
        displaying the haptic descriptor values in the user interface.

2. The method of claim 1, wherein each of the plurality of haptic descriptors comprises descriptive language used by human observers to characterize an attribute of a material.

3. The method of claim 1, wherein the computing of the haptic descriptor values for the subset of the plurality of haptic descriptors is performed using a previously established relationship between the values for the plurality of dimensions of touch and the haptic descriptor values.

4. A method for assisting product selection according to haptic properties, the method comprising:
    measuring values for a plurality of dimensions of touch of test objects using sensing modalities of a haptic measurement system that performs exploratory movements to interact with the test objects;

storing the values for the plurality of dimensions of touch in a database;

obtaining at least one product search criterion in a user interface;

identifying a plurality of relevant products from a plurality of products in a product database, based on the at least one product search criterion;

displaying the plurality of relevant products in the user interface;

for each of the plurality of relevant products, obtaining the values for the plurality of dimensions of touch from the database; and displaying, in the user interface, information related to haptic properties for each of the plurality of relevant products, based on the values for the plurality of dimensions of touch, comprising:
- displaying a plurality of haptic descriptors in the user interface, wherein each of the plurality of haptic descriptors represents a human haptic perceptual dimension;
- identifying a subset of the plurality of haptic descriptors based on a selection made in the user interface;
- for each of the plurality of relevant products, computing haptic descriptor values for the subset of the plurality of haptic descriptors using the values for the plurality of dimensions of touch, and for each of the plurality of relevant products, computing a haptic desirability based on the haptic descriptor values; and
- reordering the displaying of the plurality of relevant products based on the haptic desirability.

5. A method for assisting product selection according to haptic properties, the method comprising:

measuring values for a plurality of dimensions of touch of test objects using sensing modalities of a haptic measurement system that performs exploratory movements to interact with the test objects;

storing the values for the plurality of dimensions of touch in a database;

obtaining at least one product search criterion in a user interface;

identifying a plurality of relevant products from a plurality of products in a product database. based on the at least one product search criterion;

displaying the plurality of relevant products in the user interface;

for each of the plurality of relevant products, obtaining the values for the plurality of dimensions of touch from the database; and displaying, in the user interface, information related to haptic properties for each of the plurality of relevant products, based on the values for the plurality of dimensions of touch, comprising:
- displaying a plurality of haptic descriptors in the user interface, wherein each of the plurality of haptic descriptors represents a human haptic perceptual dimension;
- obtaining a weight for each of the plurality of haptic descriptors, in the user interface;
- for each of the plurality of relevant products, computing haptic descriptor values for the plurality of haptic descriptors using the values for the plurality of dimensions of touch; and
- for each of the plurality of relevant products, computing a haptic desirability based on the plurality of haptic descriptor values and the weights associated with the plurality of haptic descriptors; and
- reordering the displaying of the plurality of relevant products based on the desirability.

6. A method for assisting product selection according to haptic properties, the method comprising:

measuring values for a plurality of dimensions of touch of test objects using sensing modalities of a haptic measurement system that performs exploratory movements to interact with the test objects;

storing the values for the plurality of dimensions of touch in a database;

obtaining at least one product search criterion in a user interface;

identifying a plurality of relevant products from a plurality of products in a product database, based on the at least one product search criterion;

displaying the plurality of relevant products in the user interface;

for each of the plurality of relevant products, obtaining the values for the plurality of dimensions of touch from the database; and displaying, in the user interface, information related to haptic properties for each of the plurality of relevant products, based on the values for the plurality of dimensions of touch, comprising:
- obtaining a selection of a most desirable product of the plurality of relevant products in the user interface;
- based on a product type of the plurality of relevant products, setting a weighting for the values for the plurality of dimensions of touch;
- for each of the plurality of relevant products, computing a haptic undesirability based on:
  - a distance between the most desirable product and the relevant product based on the associated values for the plurality of dimensions of touch, and the weighting; and
- reordering the displaying of the plurality of relevant products based on the haptic undesirability.

7. The method of claim 6, wherein setting the weighting comprises selecting a set of weights in a database, wherein the database comprises one set of weights for each of a plurality of product types.

8. The method of claim 7, wherein the set of weights for one of the plurality of product types is established to reflect the relative benefit of each of the plurality of dimensions of touch for the haptic desirability of the product type.

9. A method for assisting product selection according to haptic properties, the method comprising:

measuring values for a plurality of dimensions of touch of test objects using sensing modalities of a haptic measurement system that performs exploratory movements to interact with the test objects;

storing the values for the plurality of dimensions of touch in a database;

obtaining at least one product search criterion in a user interface;

identifying a plurality of relevant products from a plurality of products in a product database, based on the at least one product search criterion;

displaying the plurality of relevant products in the user interface;

for each of the plurality of relevant products, obtaining the values for the plurality of dimensions of touch from the database; and displaying, in the user interface, information related to haptic properties for each of the plurality of relevant products, based on the values for the plurality of dimensions of touch, comprising:

obtaining a plurality of ratings of a plurality of evaluation samples in the user interface; obtaining, for each of the plurality of evaluation samples, values for the plurality of dimensions of touch;

for each of the plurality of relevant products, computing a haptic undesirability based on:
  the values for the plurality of dimensions of touch associated with the relevant product,
  the values for the plurality of dimensions of touch associated with the evaluation samples, and
  the plurality of ratings;

reordering the displaying of the plurality of relevant products based on the haptic undesirability.

10. A method for assisting product selection according to haptic properties, the method comprising:

measuring values for a plurality of dimensions of touch of test objects using sensing modalities of a haptic measurement system that performs exploratory movements to interact with the test objects;

storing the values for the plurality of dimensions of touch in a database;

obtaining at least one product search criterion in a user interface:

identifying a plurality of relevant products from a plurality of products in a product database, based on the at least one product search criterion;

displaying the plurality of relevant products in the user interface;

for each of the plurality of relevant products, obtaining the values for the plurality of dimensions of touch from the database; and displaying, in the user interface, information related to haptic properties for each of the plurality of relevant products, based on the values for the plurality of dimensions of touch, comprising:

obtaining a plurality of ratings of a plurality of evaluation samples in the user interface;

obtaining, for each of the plurality of evaluation samples, values for the plurality of dimensions of touch;

computing a plurality of weights based on a discriminability of the evaluation samples; for each of the plurality of relevant products, computing a haptic undesirability based on:
  the values for the plurality of dimensions of touch associated with the relevant product,
  the values for the plurality of dimensions of touch associated with the evaluation samples,
  the plurality of ratings, and
  the plurality of weights;

reordering the displaying of the plurality of relevant products based on the haptic undesirability.

11. The method of claim 10, wherein the plurality of evaluation samples comprises at least one selected from physical swatches and virtual swatches.

12. The method of claim 1, wherein obtaining a value for one of the plurality of dimensions of touch comprises a mechanical interaction of the haptic measurement system with the relevant product to measure one of a mechanical and a thermal characteristic of the relevant product using one of the sensing modalities.

13. The method of claim 1, wherein each of the plurality of dimensions of touch comprises at least one selected from:
  a macrotexture roughness,
  a macrotexture coarseness,
  a macrotexture regularity,
  a microtexture roughness,
  a microtexture coarseness,
  a thermal cooling, and
  a thermal persistence.

* * * * *